(12) United States Patent
Watanabe et al.

(10) Patent No.: US 11,042,731 B2
(45) Date of Patent: *Jun. 22, 2021

(54) ANALYSIS DEVICE, RECORDING MEDIUM, AND ANALYSIS METHOD

(71) Applicant: SONY CORPORATION, Tokyo (JP)

(72) Inventors: Yusuke Watanabe, Tokyo (JP); Hideyuki Matsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,168

(22) Filed: Dec. 30, 2019

(65) Prior Publication Data

US 2020/0134303 A1 Apr. 30, 2020

Related U.S. Application Data

(63) Continuation of application No. 15/033,755, filed as application No. PCT/JP2014/079389 on Nov. 6, 2014, now Pat. No. 10,558,854.

(30) Foreign Application Priority Data

Dec. 27, 2013 (JP) .................................. 2013-273516

(51) Int. Cl.
*G06K 9/00* (2006.01)
*G09B 19/00* (2006.01)
(Continued)

(52) U.S. Cl.
CPC .......... *G06K 9/00342* (2013.01); *A63B 71/06* (2013.01); *G06K 9/6215* (2013.01); *G09B 19/0038* (2013.01)

(58) Field of Classification Search
CPC . A63B 24/0006; A63B 71/0622; A63B 71/06; G06K 9/00342
See application file for complete search history.

(56) References Cited

U.S. PATENT DOCUMENTS 9,327,177 B2* 5/2016 Yamamoto ............. A63B 69/38
2006/0025229 A1* 2/2006 Mahajan ............ A63B 24/0003
473/131
(Continued)

FOREIGN PATENT DOCUMENTS

JP H05-081232 4/1993
JP 2012-254205 12/2012
(Continued)

OTHER PUBLICATIONS

Elliott, "Zepp Tennis User Guide", Nov. 4, 2013, pp. 1-10.
(Continued)

*Primary Examiner* — Malina D. Blaise
(74) *Attorney, Agent, or Firm* — Paratus Law Group, PLLC

(57) ABSTRACT

To analyze data obtained from a series of sports plays as a series or a set, an analysis device is provided, including: a process configured to implement an acquisition function of acquiring data indicating play events defined based on a motion of a user who plays a sport, an extraction function of extracting a plurality of play events classified into the same type among the play events, and an analysis function of analyzing data indicating the plurality of extracted play events.

8 Claims, 17 Drawing Sheets

(51) Int. Cl.
*G06K 9/62* (2006.01)
*A63B 71/06* (2006.01)

(56) References Cited

U.S. PATENT DOCUMENTS

| | | | |
|---|---|---|---|
| 2006/0084516 A1* | 4/2006 | Eyestone | A63B 69/3632 473/219 |
| 2006/0184336 A1* | 8/2006 | Kolen | G01C 19/00 702/150 |
| 2007/0105664 A1* | 5/2007 | Scheinert | A63B 49/00 473/461 |
| 2007/0135225 A1* | 6/2007 | Nieminen | A63B 24/0006 473/212 |
| 2007/0206837 A1* | 9/2007 | Kirby | G06K 9/00335 382/107 |
| 2008/0200287 A1* | 8/2008 | Marty | A63B 24/0021 473/459 |
| 2009/0036237 A1* | 2/2009 | Nipper | A63B 60/46 473/409 |
| 2010/0144414 A1* | 6/2010 | Edis | G16H 20/30 463/8 |
| 2011/0021280 A1* | 1/2011 | Boroda | A63B 49/00 473/220 |
| 2011/0183787 A1* | 7/2011 | Schwenger | A63B 49/02 473/553 |
| 2011/0305369 A1* | 12/2011 | Bentley | G06K 9/00624 382/103 |
| 2012/0038549 A1* | 2/2012 | Mandella | G06F 3/011 345/156 |
| 2012/0277035 A1* | 11/2012 | Ueda | G01N 29/045 473/409 |
| 2012/0277890 A1* | 11/2012 | Han | A63B 69/3623 700/91 |
| 2013/0018493 A1* | 1/2013 | Amini | A63B 24/0006 700/91 |
| 2013/0018494 A1* | 1/2013 | Amini | A63B 24/0006 700/91 |
| 2013/0053190 A1* | 2/2013 | Mettler | A63B 49/00 473/463 |
| 2013/0095962 A1* | 4/2013 | Yamamoto | A63B 49/00 473/464 |
| 2013/0102419 A1* | 4/2013 | Jeffery | A63B 24/0006 473/409 |
| 2013/0127866 A1* | 5/2013 | Yamamoto | G06T 11/206 345/440 |
| 2013/0158939 A1* | 6/2013 | Yamamoto | G09B 19/0038 702/141 |
| 2014/0228712 A1 | 8/2014 | Elliott et al. | |
| 2014/0228985 A1* | 8/2014 | Elliott | A63B 71/06 700/91 |
| 2017/0220855 A1* | 8/2017 | Bose | A63B 69/36 |

FOREIGN PATENT DOCUMENTS

| | | |
|---|---|---|
| JP | 2013-244405 | 12/2013 |
| WO | WO 2012/138605 A2 | 10/2012 |

OTHER PUBLICATIONS

Kitahara, et al., "A Proposal on Automatic Analysis Method of Tennis Play Using Movies of Tennis Match", ITE Technical Report, Aug. 2013, pp. 51-54, vol. 37, Issue No. 35, Japan.

Ahmadi, et al., "Towards a wearable device for skill assessment and skill acquisition of a tennis player during the first serve", Feb. 7, 2010, pp. 129-136.

* cited by examiner

FIG.15
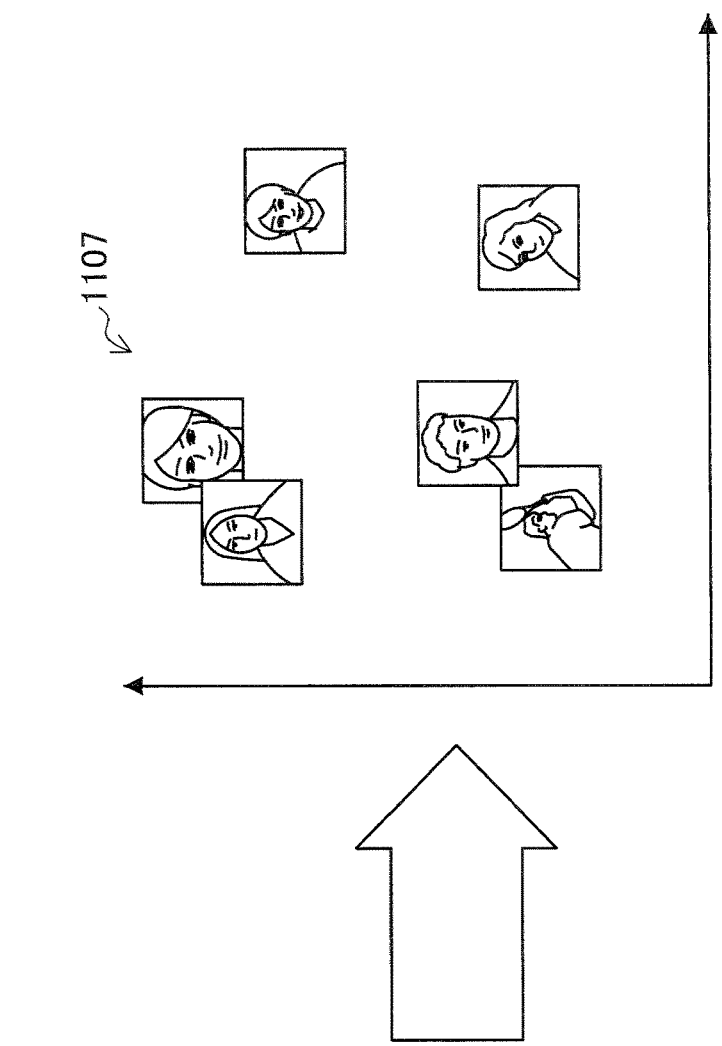
1107
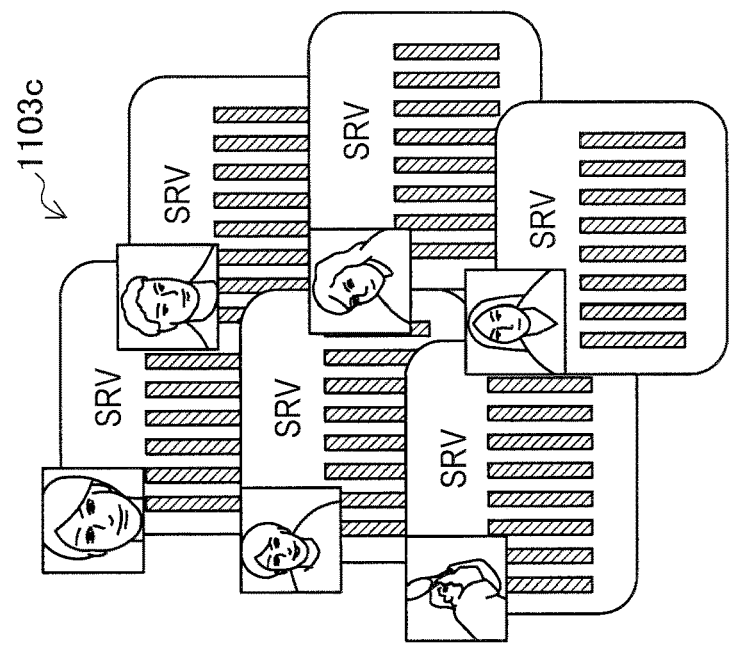
1103c

ANALYSIS DEVICE, RECORDING MEDIUM, AND ANALYSIS METHOD

CROSS REFERENCE TO PRIOR APPLICATION

This application is a continuation of U.S. patent application Ser. No. 15/033,755 (filed on May 2, 2016), which is a National Stage Patent Application of PCT International Patent Application No. PCT/JP2014/079389 (filed on Nov. 6, 2014) under 35 U.S.C. § 371, which claims priority to Japanese Patent Application No. 2013-273516 (filed on Dec. 27, 2013), which are all hereby incorporated by reference in their entirety.

TECHNICAL FIELD

The present disclosure relates to an analysis device, a recording medium, and an analysis method.

BACKGROUND ART

Techniques of assisting with a sports play using sensing or analysis have already been developed. For example, Patent Literature 1 discloses a technique of detecting a swing motion using detection data of a motion sensor, extracting data in which a swing motion is detected as swing candidate data, and selecting true swing data from swing candidate data based on a determination condition associated with a swing. Thus, for example, the user need not support a start timing and an end timing of a swing motion, and it is possible to extract swing data with a relatively small computational load.

CITATION LIST

Patent Literature

Patent Literature 1: JP 2012-254205A

SUMMARY OF INVENTION

Technical Problem

However, in the technique disclosed in Patent Literature 1, it is possible to analyze an individual swing, but acquired data is not analyzed as a series or a set.
In order to improve in a sports play, it is important to analyze an individual play such as a swing and find points for improvement, but, for example, a series of plays configuring a game or a set are interrelated, and even if an individual play is focused on, influence of plays before and after it is unignorable. Further, it is difficult to understand a game or a combination of plays unless data acquired from a series of plays is analyzed as a series or a set.

In this regard, the present disclosure proposes an analysis device, a recording medium, and an analysis method, which are novel and improved and capable of analyzing data obtained from a series of sports plays as a series or a set.

Solution to Problem

According to the present disclosure, there is provided an analysis device, including: a process configured to implement an acquisition function of acquiring data indicating play events defined based on a motion of a user who plays a sport, an extraction function of extracting a plurality of play events classified into the same type among the play events, and an analysis function of analyzing data indicating the plurality of extracted play events.

According to the present disclosure, there is provided a recording medium having a program stored therein, the program causing a computer to implement: an acquisition function of acquiring data indicating play events defined based on a motion of a user who plays a sport; an extraction function of extracting a plurality of play events classified into the same type among the play events; and an analysis function of analyzing data indicating the plurality of extracted play events.

According to the present disclosure, there is provided an analysis method, including: acquiring data indicating play events defined based on a motion of a user who plays a sport; extracting a plurality of play events classified into the same type among the play events; and analyzing data indicating the plurality of extracted play events.

Advantageous Effects of Invention

As described above, according to the present disclosure, it is possible to analyze data obtained from a series of sports plays as a series or a set.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 15 is a diagram illustrating an additional example of an analysis result of play events of a plurality of users according to the present embodiment.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. System configuration
2. Example of analysis process
2-1. Analysis of play events of single user
2-2. Analysis of play events of plurality of users
3. Hardware configurations
4. Supplement The following description will proceed with a specific example of sports (tennis), but an application range of the present technology is not limited to the sports described below. For example, the present technology can be applied to any sport as long as a play event is defined based on a motion of the user who plays the sport.

(1. System Configuration)

Figure 1:
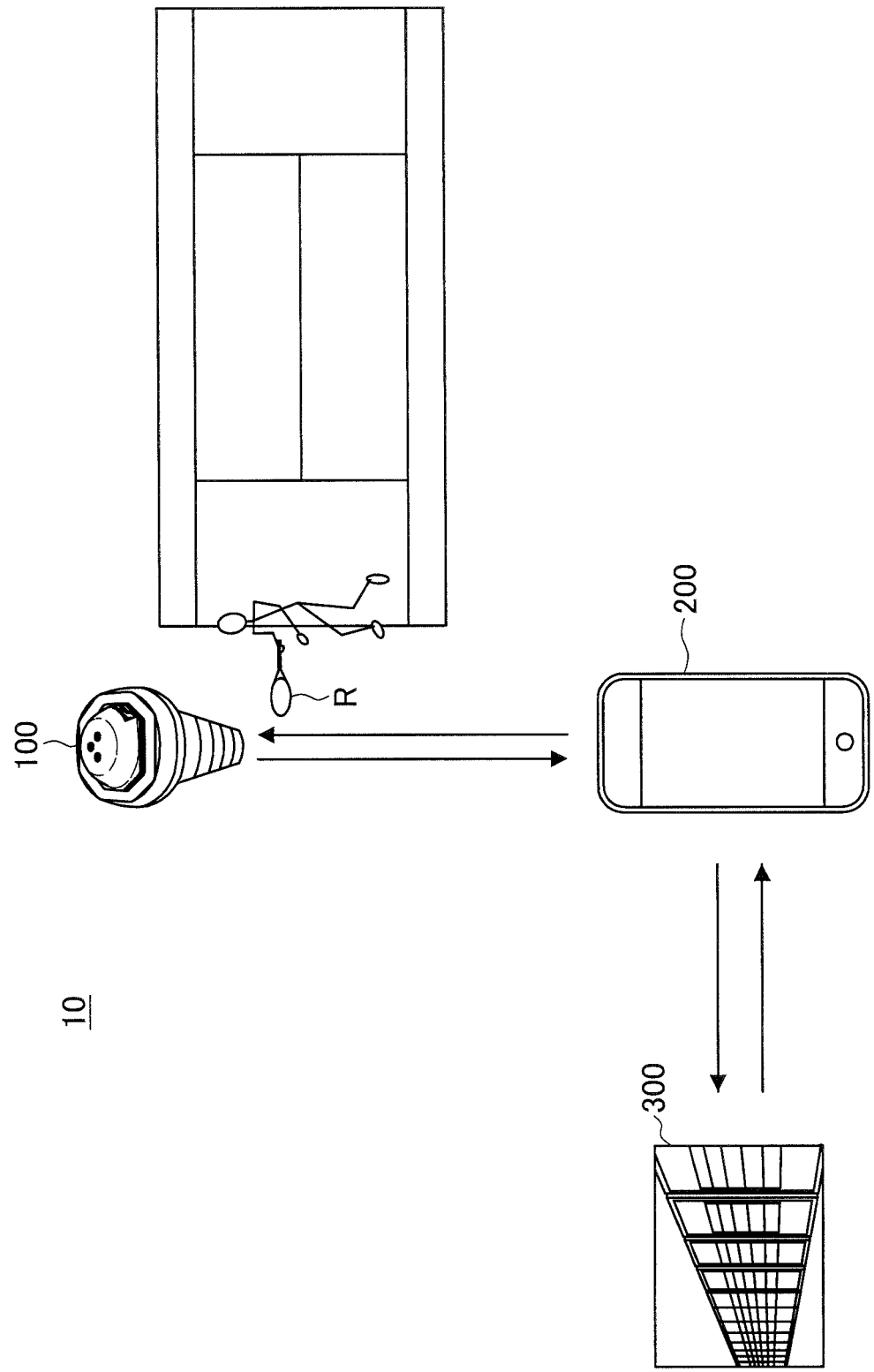
FIG. 1 is a diagram illustrating an example of a system configuration according to an embodiment of the present disclosure.

FIG. 1 is a figure which shows an example of a system configuration according to an embodiment of the present disclosure. With reference to FIG. 1, the system 10 includes a sensor apparatus 100, a smart phone 200, and a server 300.

The sensor apparatus 100 is mounted in a tennis racket R. The sensor apparatus 100 includes, for example, a motion sensor (for example, an acceleration sensor, a gyro sensor, a geomagnetic sensor, or the like). In this case, the sensor apparatus 100 directly detects a motion of the racket R, but since the racket R is gripped by the user and moves according to the user's intention, it can be said that the sensor apparatus 100 detects the motion of the user indirectly through the motion of the racket R. In the present disclosure, in this case, it can be said that the sensor apparatus 100 is indirectly mounted on the user and detects the motion of the user.

In another embodiment, the sensor apparatus 100 may be mounted, for example, on clothing or a shoe of the user. In this case, the sensor apparatus 100 directly detects a motion of the clothing or the shoe, but since the clothing or the shoe moves with the user, it can be said that the sensor apparatus indirectly detects the motion of the user. Alternatively, the sensor apparatus 100 may be directly mounted on the user and, for example, may be put around an arm in a band form. In this case, the sensor apparatus 100 directly detects the motion of the user. In addition to when the sensor apparatus 100 directly detects the motion of the user, even when the sensor apparatus 100 indirectly detects the motion of the user, it is possible to define a play event corresponding to the motion of the user who plays a sport based on a detection result provided by the sensor apparatus 100 as long as the motion of the user is reflected in the detected motion.

The sensor apparatus 100 may further include a vibration sensor. For example, intervals (for example, intervals before and after an impact on a ball) corresponding to a play event can be easily specified based on data detected by the vibration sensor. Further, the data detected by the vibration sensor may be used for analysis of a play event as well, similarly to the data detected by the motion sensor. The sensor apparatus 100 may further include a sensor that acquires environmental information of the user who plays a sport such as a temperature, moisture, brightness, or a position. The data detected by various kinds of sensors with which the sensor apparatus 100 is equipped is preprocessed as necessary and then transmitted to the smart phone 200 through wireless communication such as Bluetooth (a registered trademark).

For example, the smart phone 200 is arranged near the user who is playing a sport. In this case, the smart phone 200 receives the data transmitted from the sensor apparatus 100 through wireless communication such as Bluetooth (a registered trademark), temporarily accumulates or processes the received data as necessary, and transmits the resulting data to the server 300 through network communication. The smart phone 200 may receive a result of analysis performed by the server 300 based on the transmitted data and output the analysis result to the user through a display, a speaker, or the like. The analysis result may be output when the user is not playing a sport. The output of the analysis result may be performed by an information processing terminal used by the user such as a personal computer or a tablet terminal, a game machine, a television, or the like, separately from the smart phone 200.

The smart phone 200 may not necessarily be arranged near the user who is playing a sport. In this case, the sensor apparatus 100 accumulates the detected data in an internal storage region (a memory or an external storage device). For example, the data may be transmitted from the sensor apparatus 100 to the smart phone 200 through wireless communication such as Bluetooth (a registered trademark) when the sensor apparatus 100 and the smart phone 200 approach each other after the sports play. Alternatively, the data may be transmitted when the sensor apparatus 100 is connected with the smart phone 200 in a wired manner such as USB after the sports play. Further, a removable recording medium may be used for the data transfer from the sensor apparatus 100 to the smart phone 200.

The server 300 communicates with the smart phone 200 via network, and receives the data detected by various kinds of sensors with which the sensor apparatus 100 is equipped. The server 300 performs an analysis process using the received data, and generates various information related to a sports play. For example, the server 300 defines a play event based on data that directly or indirectly indicates the motion of the user who plays a sport and is acquired by the motion sensor. For example, the play event corresponds to a single shot using the racket R. By defining the play event, for example, it is possible to understand plays of the user indicated by motion data as a sequence of plays having a meaning such as {serve, stroke, volley, . . . }.

In addition, the server 300 may extract a plurality of play events classified into the same type among the play events through the analysis process for the play event and analyze data indicating a plurality of extracted play events. For example, information generated by the analysis process of the server 300 is transmitted to the smart phone 200 and output toward the user through the display or the speaker of the smart phone 200. Alternatively, the server 300 may transmit the information to an information processing terminal other than the smart phone 200 and output the information toward the user. The server 300 may perform the analysis process based on data received for each of a plurality of users, generate information based on a result of comparing, for example, play patterns generated for each user, and transmit the generated information to the information processing terminal of each user.

Figure 2:
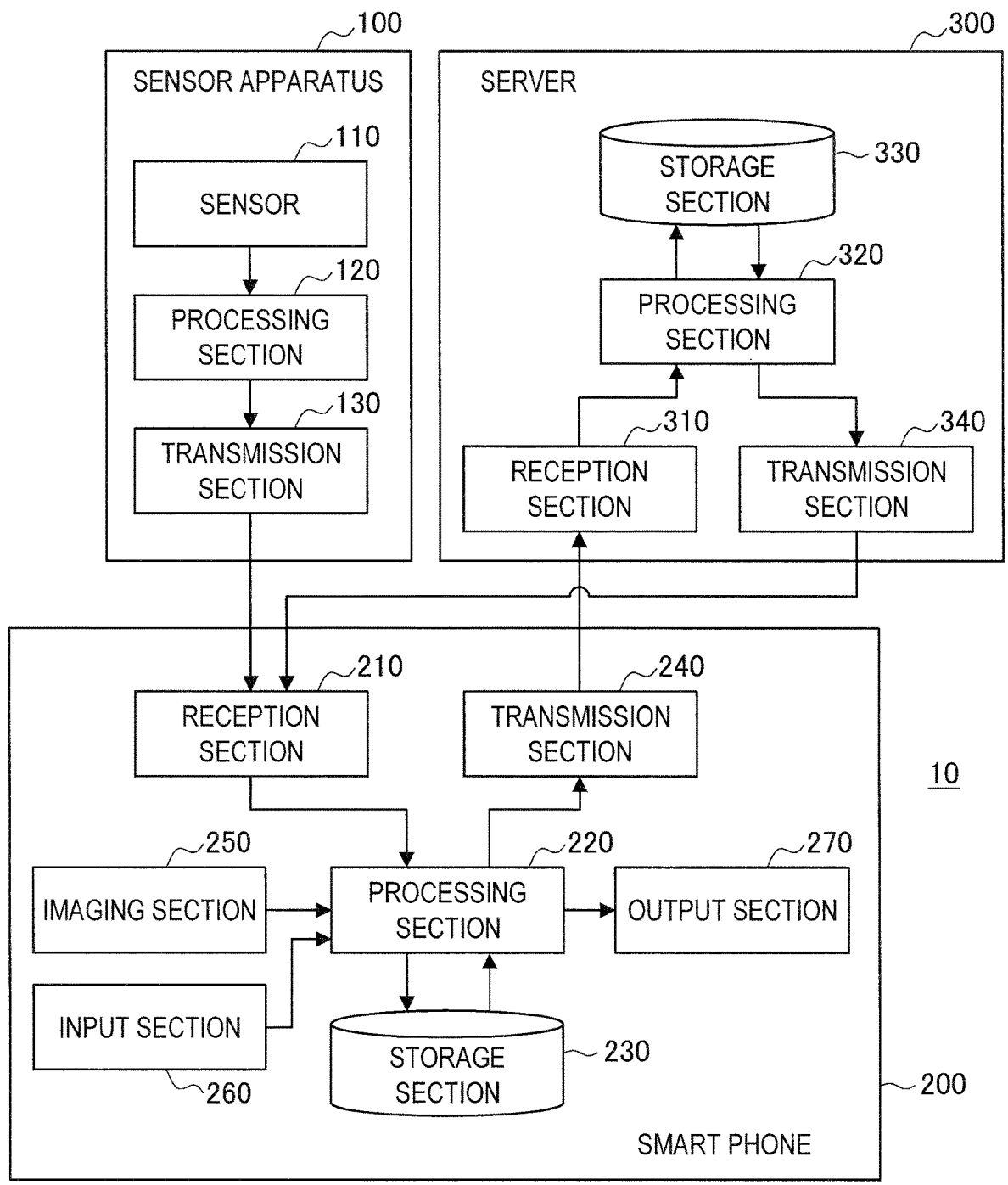
FIG. 2 is a block diagram schematically illustrating a device configuration of a system according to an embodiment of the present disclosure.

FIG. 2 is a block diagram schematically illustrating a device configuration of a system according to an embodiment of the present disclosure. Referring to FIG. 2, the sensor apparatus 100 includes a sensor 110, a processing section 120, and a transmission section 130. The smart phone 200 includes a reception section 210, a processing section 220, a storage section 230, a transmission section 240, an imaging section 250, an input section 260, and an output section 270. The server 300 includes a reception section 310, a processing section 320, a storage section 330, and a transmission section 340. Hardware configuration examples (hardware configuration examples of the sensor apparatus and the analysis device and the analysis device) for implementing the respective devices will be described later.

In the sensor apparatus 100, the processing section 120 processes the data acquired by the sensor 110, and the transmission section 130 transmits the processed data to the smart phone 200. The sensor 110 includes, for example, the motion sensor that directly or indirectly detects the motion of the user who plays the sport as described above. The sensor 110 may further include the vibration sensor, a sensor for acquiring the environmental information of the user, or the like. The processing section 120 is implemented by a processor that operates according to a program, and performs preprocessing on the data acquired by the sensor 110 as necessary. The preprocessing may include, for example, sampling, noise reduction, or the like. The preprocessing may not necessarily be performed. The transmission section 130 is implemented by a communication device, and transmits the data to the smart phone 200, for example, using wireless communication such as Bluetooth (a registered trademark). Although not illustrated in FIG. 2, the sensor apparatus 100 may include a storage section that temporarily accumulates data.

In the smart phone 200, the reception section 210 receives the data transmitted by the sensor apparatus 100, and the transmission section 240 transmits data to the server 300. The reception section 210 and the transmission section 240 are implemented by a communication device that performs, for example, wireless communication such as Bluetooth (a registered trademark) and wired or wireless network communication. The received data is temporarily stored in the storage section 230 and then transmitted, for example, through the processing section 220. The processing section 220 may perform preprocessing on the received data. The processing section 220 is implemented by a processor that operates according to a program, and the storage section 230 is implemented by a memory or a storage. The reception section 210 may further receive information transmitted from the server 300. For example, the received information may be output toward the user from the output section 270 according to control of the processing section 220. The output section 270 includes, for example, a display or a speaker.

Further, in the smart phone 200, the imaging section 250 acquires an image. For example, the imaging section 250 is implemented by a camera module in which an imaging element is combined with an optical system such as a lens. The image may include the user who plays a sport as a subject. For example, the image acquired by the imaging section 250 is transmitted from the transmission section 240 to the server 300 together with the data received through the reception section 210. For example, the server 300 may use the image for the analysis process together with the data acquired by the sensor apparatus 100 or may embed the image in information generated by the analysis process. The input section 260 includes, for example, a touch panel, a hardware button, a microphone that receives an audio input, and/or a camera that receives a gesture input. The processing section 220 may request the server 300 to transmit information through the transmission section 240 according to a user operation acquired through the input section 260.

The server 300 includes a reception section 310, a processing section 320, a storage section 330, and a transmission section 340. The reception section 310 is implemented by a communication apparatus, and receives data transmitted by using network communication such as the internet from the smart phone 200. The processing section 320 is implemented, for example, by a processor such as a CPU, and processes the received data. For example, the processing section 320 executes an analysis process of the process of the received data, and may additionally accumulate data after analysis in the storage section 330, or may output the data via the transmission section 340. Alternatively, the processing section 320 may only execute a control of the accumulation or output of the data already analyzed in the smart phone 200 or the like.

The configuration of the system according to an embodiment of the present disclosure has been described above. The above-described configuration is an example, and various modifications can be made in other embodiments. For example, in the above example, the analysis process using the data acquired by the sensor apparatus 100 is performed by the processing section 320 of the server 300, but the analysis process may be performed by the processing section 220 of the smart phone 200 or the processing section 120 of the sensor apparatus 100. The system 10 has been described as including the sensor apparatus 100, the smart phone 200, and the server 300, but, for example, when the processing section 220 of the smart phone 200 performs the analysis process, the system 10 may not include the server 300. Alternatively, in this case, the server 300 provides a service of storing the information obtained by the analysis process and sharing the information with the user. Further, for example, when the processing section 120 of the sensor apparatus 100 performs the analysis process, the system 10 may not include the smart phone 200 and the server 300. The sensor apparatus 100 may be, for example, a dedicated sensor apparatus mounted on the user or a tool, or a sensor module mounted in a portable information processing terminal may function as the sensor apparatus 100. Thus, the sensor apparatus 100 may be implemented in the same apparatus as the smart phone 200.

(2. Example of Analysis Process)

Figure 3:
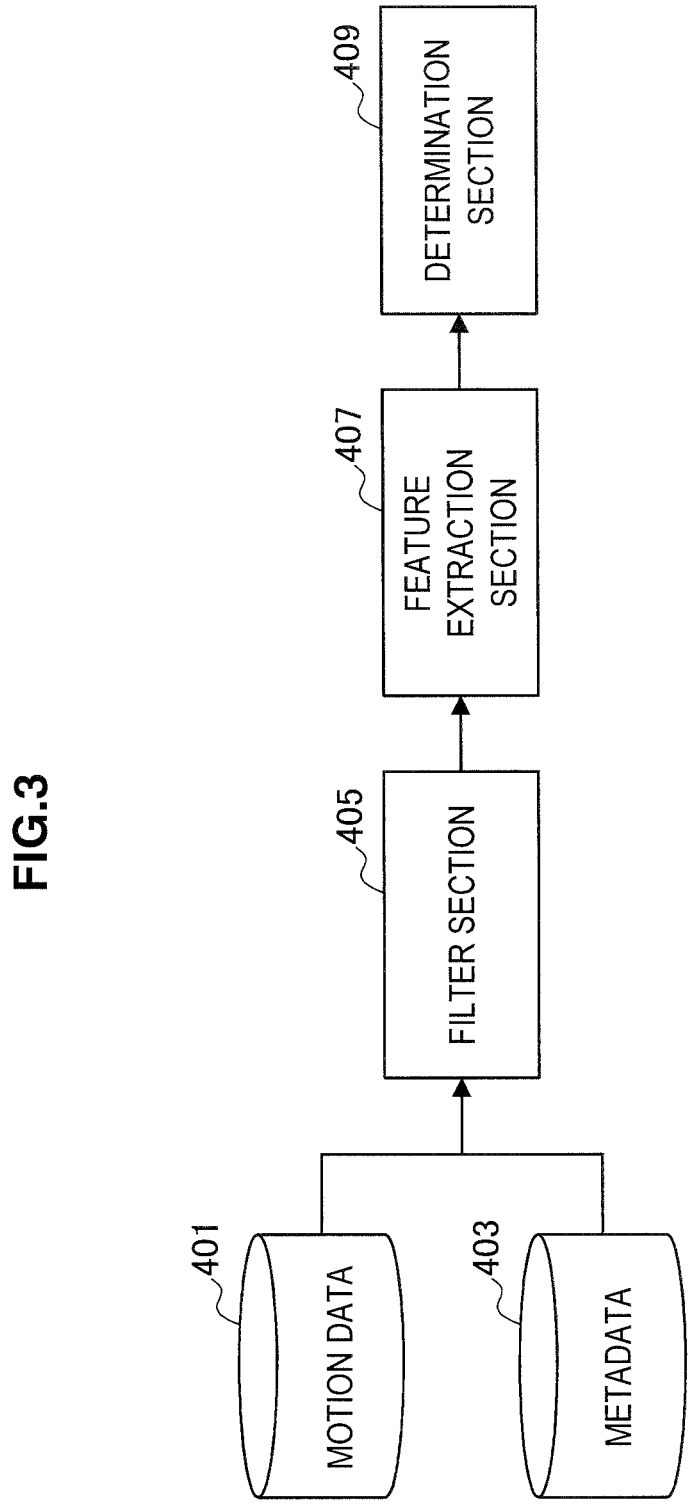
FIG. 3 is a diagram for describing an example of an analysis process according to an embodiment of the present disclosure.

FIG. 3 is a diagram for describing an example of the analysis process according to an embodiment of the present disclosure. Referring to FIG. 3, the processor that performs the analysis process acquires motion data 401 and metadata 403 indicating the play event defined based on the motion of the user who plays the sport as an input. Then, the processor extracts a plurality of play events classified into the same type among the play events indicated by the data through a function of a filter section 405. Further, the processor extracts a feature of a motion indicated by the data corresponding to a plurality of extracted play events through a function of a feature extraction section 407, and performs determination based on the feature through a function of a determination section 409.

Here, the motion data 401 is data acquired through the motion sensor arranged in the sensor 110 with which the sensor apparatus 100 is equipped, and indicates the motion of the user who plays the sport. The metadata 403 is data indicating the play event defined based on the motion. In the illustrated example, the motion data 401 is associated with the metadata 403. The metadata 403 defines, for example, a type or an attribute of the play event indicated by the associated motion data 401. For example, in the case of tennis, the type of play event may include a type of shot such as a serve, a forehand stroke, a backhand stroke, a forehand volley, and the like. Further, in this case, the attribute of the play event may include information such as an occurrence time (for example, a time at which a racket impacts a ball), a swing speed, and the like.

The motion data 401 and the metadata 403 are an example of data indicating the play event, and data indicating the play event may be acquired in various other forms. For example, an individual play event may be indicated by a single piece of data in which the motion data is combined with the metadata, and motion data indicating a plurality of play events which occur consecutively may be integrated into one, and different intervals of the motion data may be referred to by a plurality of pieces of metadata.

As described above, the filter section 405 extracts a plurality of play events classified into the same type from among the play events indicated by the motion data 401 and the metadata 403. As described above, for example, in the case of tennis, the type of play event may include a type of shot such as a serve, a forehand stroke, a backhand stroke, a forehand volley, and the like. In this regard, the filter section 405 extracts the play event of the type of any one shot. A single play event may be extracted. However, in this case, the analysis process performed on the extracted play event may differ from processes of the feature extraction section 407 and the determination section 409 that will be described later.

The feature extraction section 407 performs the analysis process of extracting the feature on the data indicating a plurality of play events extracted through the filter section 405, that is, the data corresponding to a plurality of play events extracted through the filter section 405 among the motion data 401 and the metadata 403. The feature extracted from the data of the play events by the feature extraction section 407 may differ, for example, according to the analysis process by the determination section 409 arranged at the subsequent stage thereto. The extracted feature may differ in the type of play event extracted by the filter section 405. For example, k-means coding, an auto-encoder, or the like may be used as a method of extracting a feature. Since these methods are already known, a detailed description thereof is omitted herein.

The determination section 409 performs some sort of determination on a plurality of play events extracted by the filter section 405 based on the feature extracted through the feature extraction section 407. For example, when a plurality of extracted play events are the play events of a single user, the determination section 409 may determine a learning level of the play indicated by the play events. More specifically, the determination section 409 may evaluate a degree of stability of the play based on the extracted feature and determine the learning level based on the degree of stability. Alternatively, the determination section 409 may determine the learning level using a learning level determination device in which learning is performed based on training data of each learning level (an advanced level, an intermediate level, and a beginner level) collected for each type of play event (for example, a type of swing) in advance.

Further, for example, when a plurality of extracted play events include the play events of a plurality of users, the determination section 409 may determine a degree of similarity of the plays of the users indicated by the play events. More specifically, the determination section 409 may calculate distances of the plays of the users in a feature space based on the extracted feature (similar to evaluation of the degree of stability) and determine the degree of similarity based on the distance.

The processor that performs the analysis process may further implement a function of causing information generated in the analysis to be displayed on a display (which is arranged in the output section 270 of the smart phone 200, for example). In this case, for example, information indicating the feature extracted through the feature extraction section 407 may be displayed on the display. Several examples of such a display will be described later.

The analysis process performed by the feature extraction section 407 and the determination section 409 in the above example may be replaced with an analysis process according to any other method, for example, an analysis process that does not depend on feature extraction. For example, when a motion of the user in a certain type of play event is indicated as a waveform of acceleration or the like by the motion data 401, the degree of stability or the degree of similarity may be determined based on a distance between waveforms of a predetermined number of sample intervals. Further, in the analysis process, for example, a habit in the play of the user may be detected.

Figure 4:
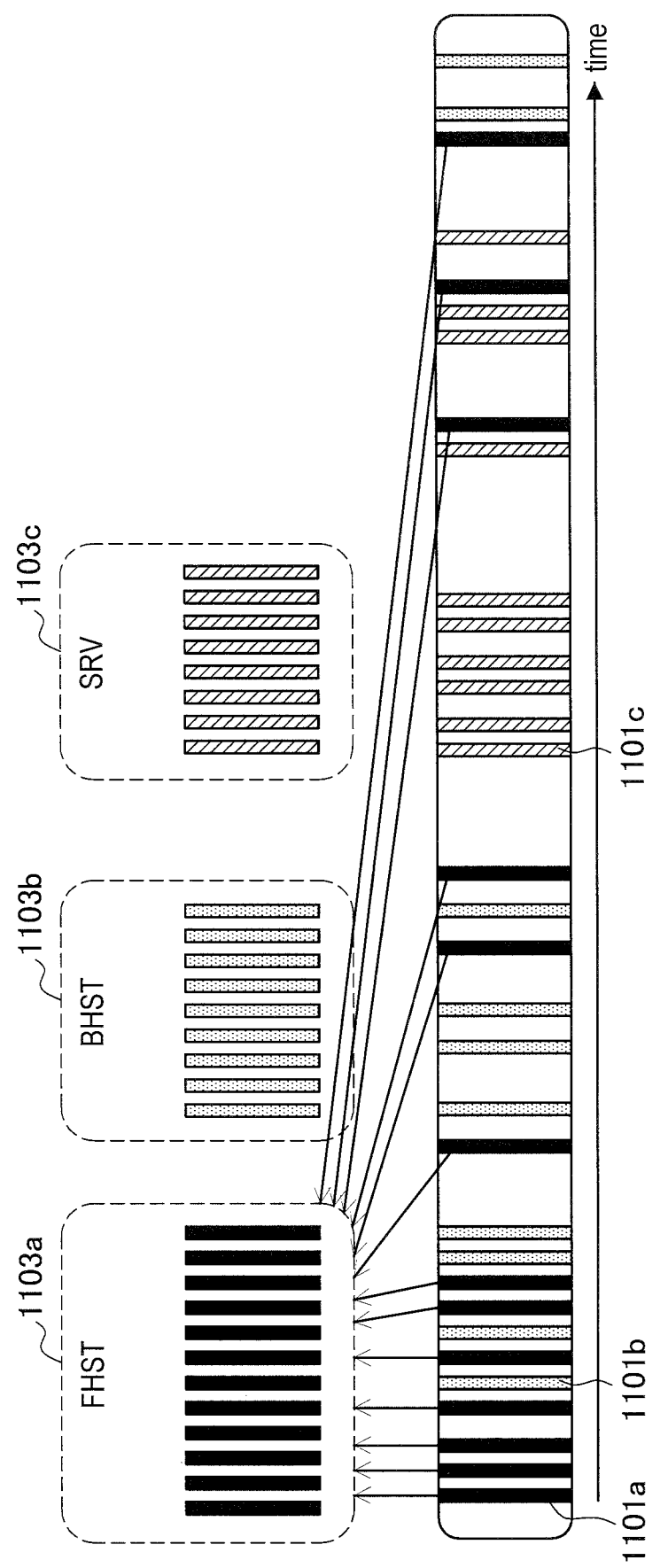
FIG. 4 is a diagram conceptually illustrating a function of a filter section in the example of FIG. 3.

FIG. 4 is a diagram conceptually illustrating the function of the filter section in the example of FIG. 3. FIG. 4 illustrates an example in which play event groups 1103 of the same type are extracted from a time series configured with three types of play events 1101. More specifically, the play events 1101 include a play event 1101a of a forehand stroke (FHST), a play event 1101b of a backhand stroke (BHST), and a play event 1101c of a serve (SRV). The play event groups 1103 include a play event group 1103a of a forehand stroke, a play event group 1103b of a backhand stroke, and a play event group 1103c of a serve.

For example, the filter section 405 extracts the play event groups 1103a to 1103c from the time series of the play events 1101. The play event groups 1103a to 1103c may be extracted in parallel at the same time, the analysis process for each play event group may be performed by the feature extraction section 407 and the determination section 409, and analysis results of a plurality of play event types may be output at the same time. Alternatively, some of the play event groups 1103a to 1103c may be extracted, and the analysis process for the extracted play event groups may be performed by the feature extraction section 407 and the determination section 409.

In the illustrated example, the play event groups 1103 are extracted from the play events of a single user 1101, but the same applies even when the play event groups are extracted from the play events of a plurality of users. In this case, for example, metadata such as a user ID indicating the user who performs the play event may be added to the data of the play events included in the play event group. An example in which the play event groups are extracted from the play events of a single user will be described with reference to FIGS. 5 to 7. An example in which the play event groups are extracted from the play events of a plurality of users will be described later.

(2-1. Analysis of Play Events of Single User)

Figure 5:
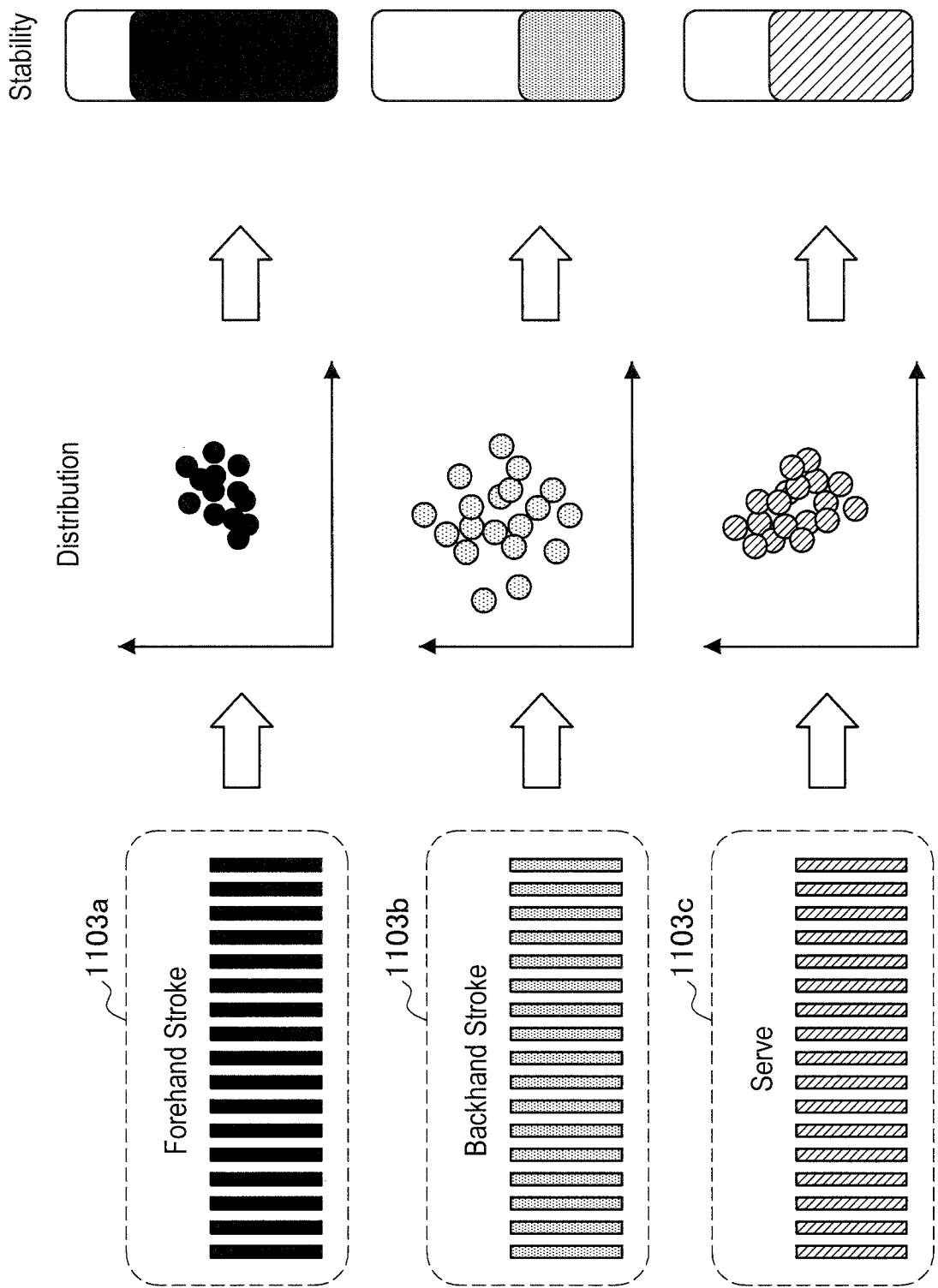
FIG. 5 is a diagram illustrating an example of analysis of play event groups extracted in the example of FIG. 4.

FIG. 5 is a diagram illustrating an example of analysis of the play event groups extracted in the example of FIG. 4. Referring to FIG. 5, for each of the play event groups 1103*a* to 1103*c* extracted by the filter section 405, the feature extraction section 407 extracts the features of the respective play events, and the determination section 409 evaluates a degree of stability based on a distribution of the features of the respective play events.

Here, the features of the respective play events are expressed, for example, as multi-dimensional feature vectors. In FIG. 5, the distribution of the feature vectors is expressed on a two-dimensional (2D) plane. For example, when a function of causing the information generated in the analysis to be displayed on the display is implemented by the processor that performs the analysis process, information indicating a distribution of the respective play events in a feature space on the 2D plane may be displayed. A technique of enabling the multi-dimensional feature vectors to be viewed on the 2D plane or a three-dimensional (3D) space is already well known, and thus a detailed description thereof is omitted herein.

In the illustrated example, the distribution of the features of the respective play events greatly differs according to the play event group 1103. Thus, the degree of stability evaluated based on the distribution greatly differs according to the play event group 1103. As will be described with reference to the next drawing, there are cases in which the degree of stability is used as an index indicating the learning level of the play. Thus, in the illustrated example, the learning level of the play can be determined for each play event group 1103, that is, for each type of play event. If the learning level is assumed to increase as the degree of stability increases, the user in the example of FIG. 5 is estimated to be relatively high in the learning level for the forehand stroke, relatively low in the learning level for the backhand stroke, and intermediate in the learning level for the serve. As described above, the fact that information of each learning level is generated for each type of play event, for example, for each type of shot in the case of tennis, is one of the advantages of the present embodiment.

Figure 6:
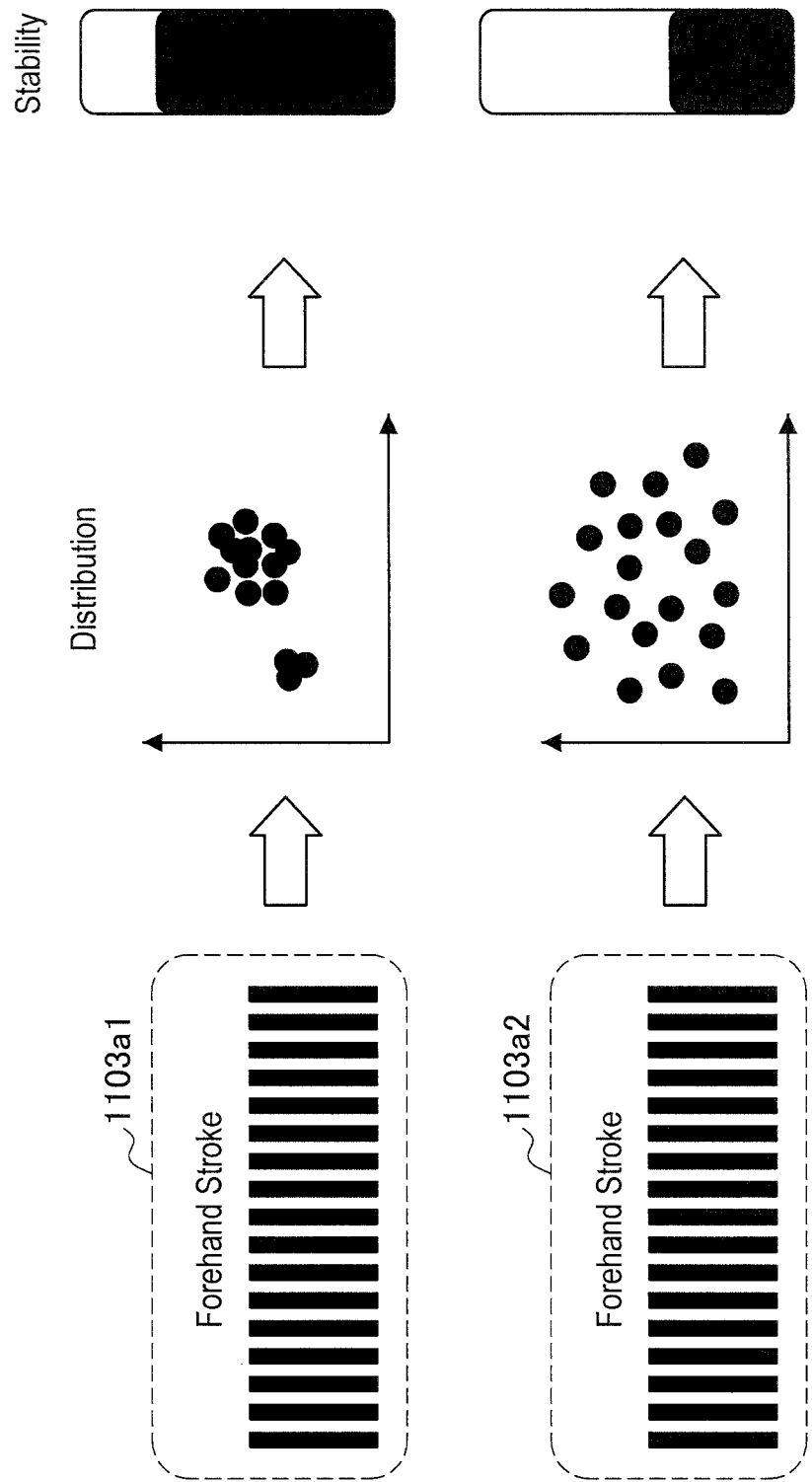
FIG. 6 is a diagram for describing a relation between a distribution of features of play events and a learning level illustrated in the example of FIG. 5.

FIG. 6 is a diagram for describing a relation between a distribution of the features of the play events and the learning level illustrated in the example of FIG. 5. Referring to FIG. 6, for two play event groups 1103*a*1 and 1103*a*2 of a forehand stroke, the degree of stability is evaluated based on a distribution. Here, the play event group 1103*a*1 is a play event group of a forehand stroke of an advanced-level tennis player, and the play event group 1103*a*2 is a play event group of a forehand stroke of a beginner-level tennis player.

According to a hypothesis formed by the inventor(s) of the present technology, the distribution of the features of the play events included in the play event group of the same type of shots decreases as the learning level increases. Thus, the distribution of the respective play events in the feature space included in the play event group 1103*a*1 of the advanced-level player is smaller than the distribution of the respective play events in the feature space included in the play event group 1103*a*2 of the beginner-level player. This is considered to be due to the fact that the advanced-level player having the high learning level has little variation in a swing motion, and the same type of swing is performed in many cases.

Here, for example, when the play event is defined for a tennis shot, the feature of the play event defined based on the motion of the user at the time of a shot differs according to a type of shot. Thus, even when the feature distribution of the play events is calculated in a state in which the play events (shots) of different types are mixed, a relation between the distribution and the degree of stability illustrated in FIG. 6 and the learning level is not held. Thus, the fact that evaluation of the degree of stability based on the above features and determination of the learning level based on the degree of stability can be performed is also one of the advantages of the present embodiment in which each of the play event groups obtained by classifying the play events into the same type is analyzed.

Figure 7:
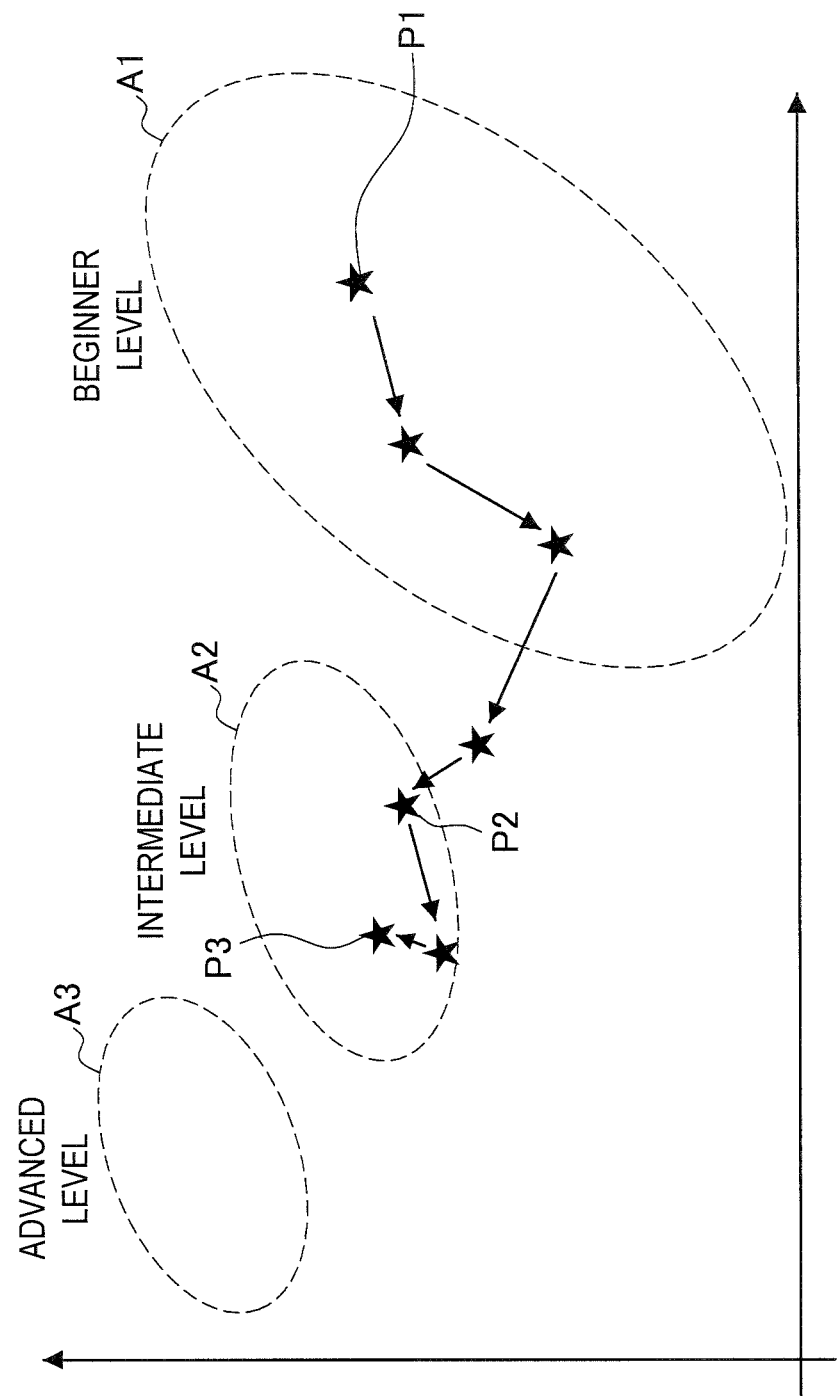
FIG. 7 is a diagram illustrating another example of analysis of features of play events in the example of FIG. 4.

FIG. 7 is a diagram illustrating another example of the analysis based on the features of the play events in the example of FIG. 4. Referring to FIG. 7, regions A1 to A3 in which the features of the play events of the players (users) of various learning levels are distributed are defined in the feature space. The region A1 is a region in which the features of the beginner-level player are distributed, the region A2 is a region in which the features of the intermediate-level player are distributed, and the region A3 is a region in which the features of the advanced-level player are distributed.

The example illustrated in FIG. 7 corresponds to the case in which the determination section 409 determines the learning level using a learning level determination device in which learning is performed based on training data of each learning level (an advanced level, an intermediate level, and a beginner level) collected for each type of play event (for example, a type of swing) in advance. In the illustrated example, the learning level determination device is formed by learning using the distribution of the features of the play events of the player of each learning level as the training data. For example, the expression of the regions on the 2D plane illustrated in FIG. 7 may also be used, for example, when the processor that performs the analysis process implements the function of causing the information generated in the analysis to be displayed on the display.

Further, in the illustrated example, points P indicating a time-series transition of a feature distribution of a certain user are illustrated in the feature space. In this example, it is illustrated that the center of the feature distribution of the user located at a point P1 in the region A1 of the beginner level when a service is initially used transitions up to a point P2 in the region A2 of the intermediate level with the improvement, and is currently moving toward the region A3 of the advanced level and located at a point P3 (or in the region A2 of the intermediate level). An expression of such a time-series transition may also be used for a display of the information generated in the analysis.

Figure 8:
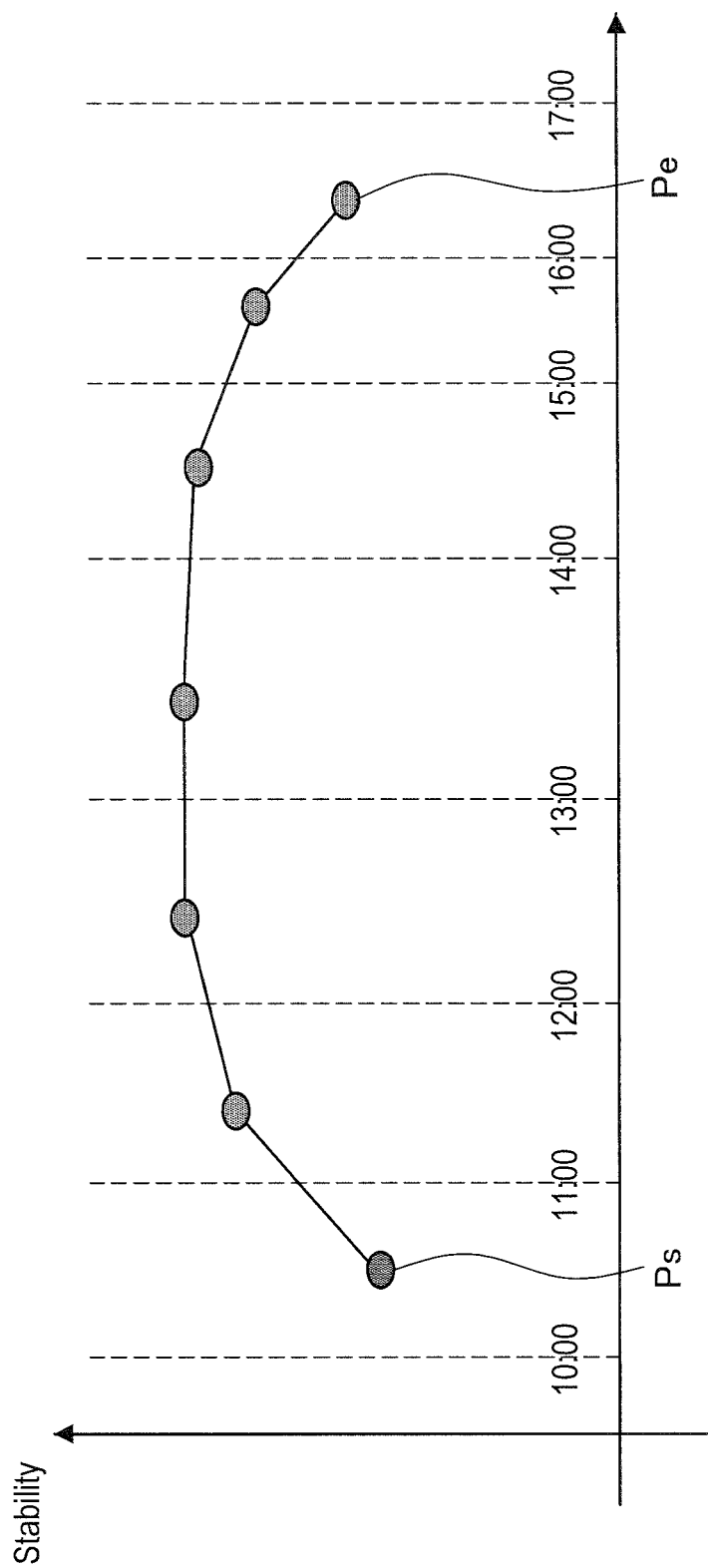
FIG. 8 is a diagram illustrating an additional example of an analysis result of play events of a single user according to the present embodiment.
Figure 9:
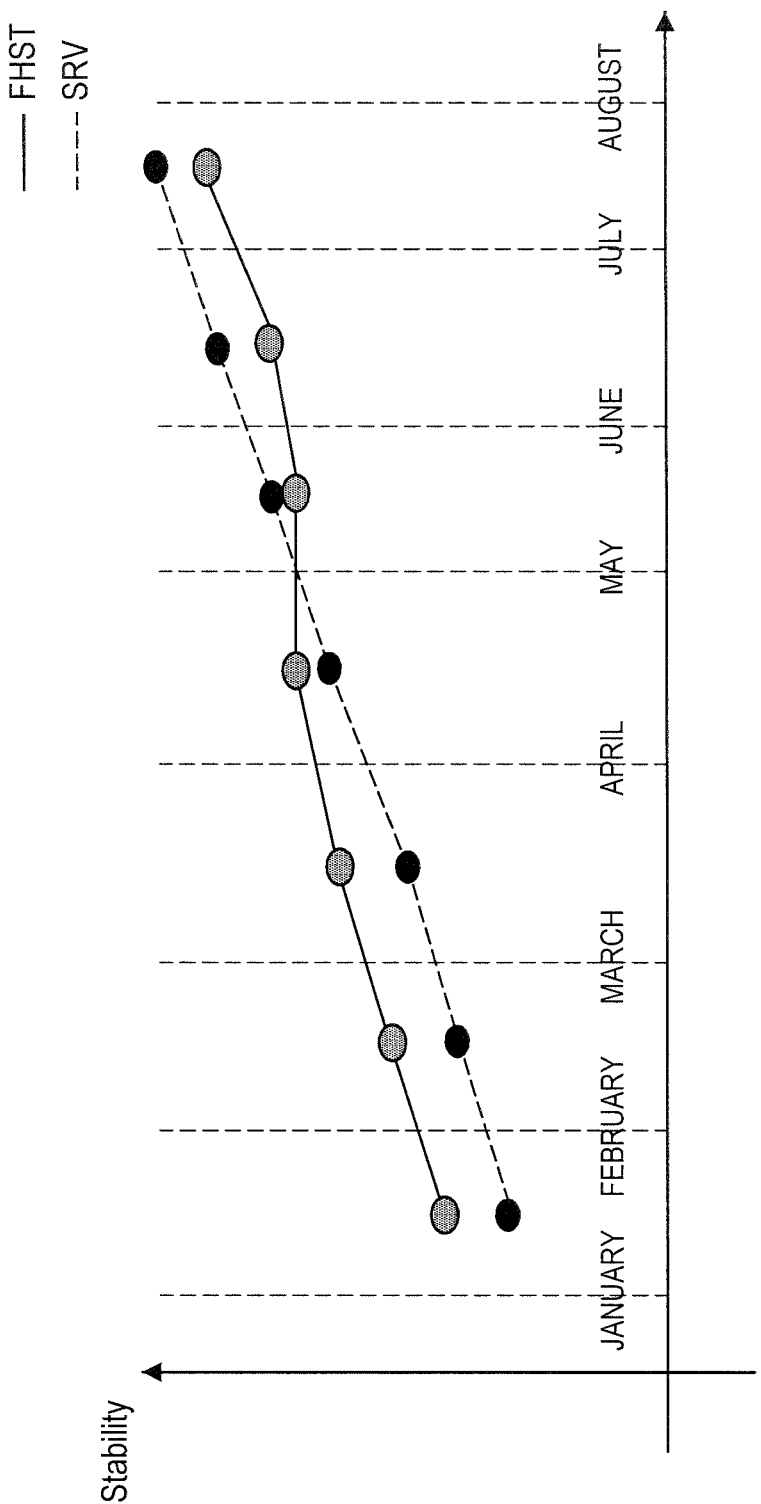
FIG. 9 is a diagram illustrating an additional example of an analysis result of play events of a single user according to the present embodiment.

FIGS. 8 and 9 are diagrams illustrating additional examples of the analysis result of the play events of a single user according to the present embodiment. An expression of such an analysis result may also be used for a display of the information generated in the analysis.

In the example illustrated in FIG. 8, a one-day temporal change in the degree of stability of the features of the play events described above with reference to FIGS. 5 and 6 is detected. In the illustrated example, for a certain day on which the user plays almost all day (about 10:00 to 17:00), the degree of stability of the features of the play events is expressed hourly by a polygonal line extending from a start point Ps to an end point Pe using time as a horizontal axis. Through such an expression, for example, information such as "time necessary for a warm-up" or "time taken until a play is influenced by fatigue" can be obtained from the one-day change in the degree of stability of the play.

Further, for example, when information related to the entire play of the user is obtained as illustrated in FIG. 8, the degree of stability of the features calculated for each type of play event may be averaged for each type of play event and output. As described above, in order to calculate the significant degree of stability, it is effective to perform the analysis process for each type of play event, but after the degree of stability is calculated, for example, an averaging process beyond the type of play event may be performed.

In the example illustrated in FIG. 9, a relatively long-term temporal change in the degree of stability of the features of the play events described above with reference to FIGS. 5 and 6 over several months is detected. In the illustrated example, the degree of stability of the features of the play events is expressed monthly during a period of January to July using time as a horizontal axis. For example, a degree of proficiency in the play over the past several months can be understood from the change in the degree of stability of the play over a certain period of time. When the degree of stability is expressed for each type of play event (shot) as in the illustrated examples, the proficiencies in the plays corresponding to the respective types of play events can be improved. Further, a similar expression can be used for comparing the degrees of stability of the different users for the same type of play event.

(2-2. Analysis of Play Events of Plurality of Users)

Figure 10:
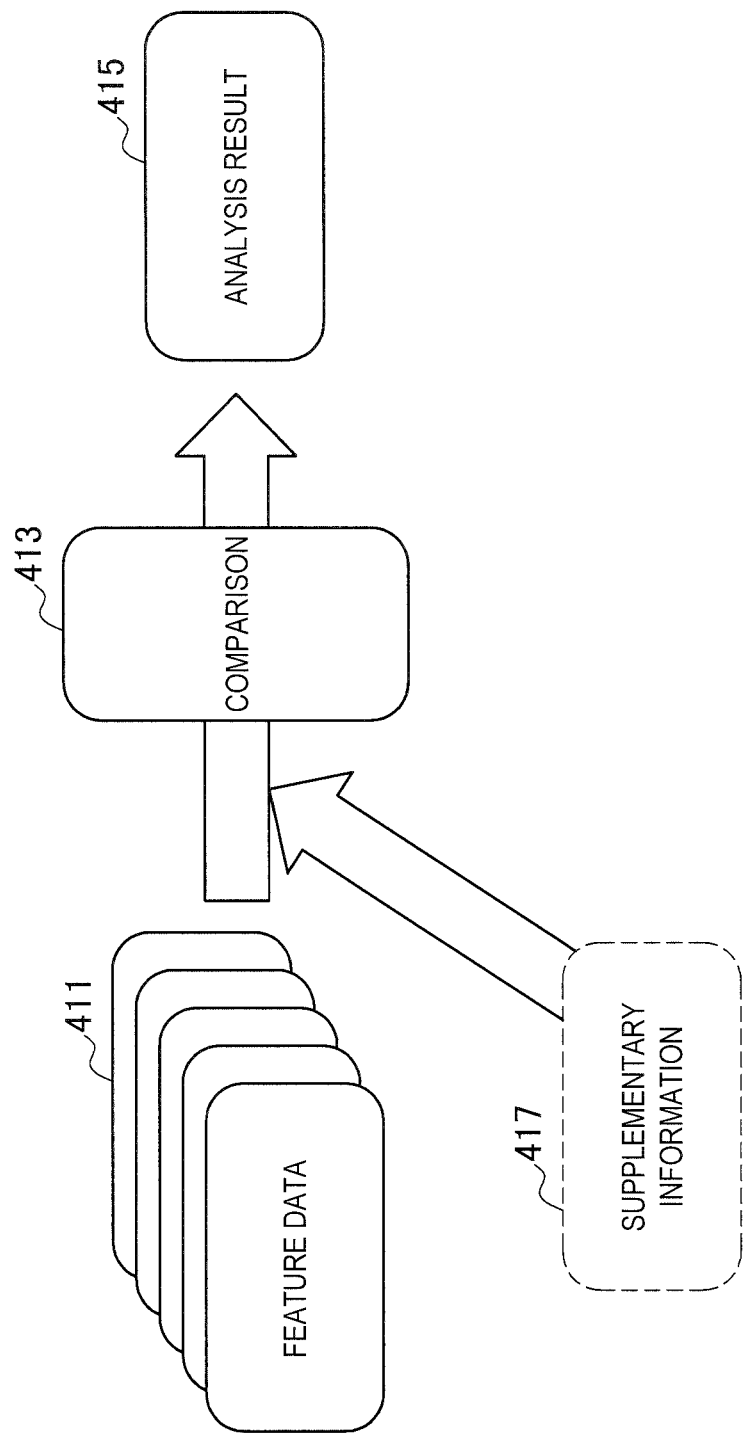
FIG. 10 is a diagram for describing an example of analysis of play events of a plurality of users according to an embodiment of the present disclosure.

FIG. 10 is a diagram for describing an example of the analysis of the play events of a plurality of users according to an embodiment of the present disclosure. Referring to FIG. 10, the processor that performs the analysis process performs a comparison process 413 based on feature data 411 extracted from the play events of a plurality of users by the feature extraction section 407, and obtains an analysis result 415. The analysis result 415 may include, for example, a feature map of a play of each player described below, a similar play map, and the like.

In the comparison process 413, further, supplementary information 417 provided to a first user whose feature data of the play events is included in the feature data 411 may be used. In this case, the supplementary information 417 for the first user may be provided to a second user (whose feature data of the play events is similarly included in the feature data 411) whose play is indicated to be similar to the first user according to the result of the comparison process 413. The supplementary information 417 may include, for example, advice on a certain type of play (in the case of tennis, for example, a forehand stroke) of the user, a past opponent of the user, an impression thereof, and the like. The same supplementary information 417 as that for the first user is likely to be effective for the second user whose play is indicated to be similar to that of the first user by the feature data 411.

Figure 11:
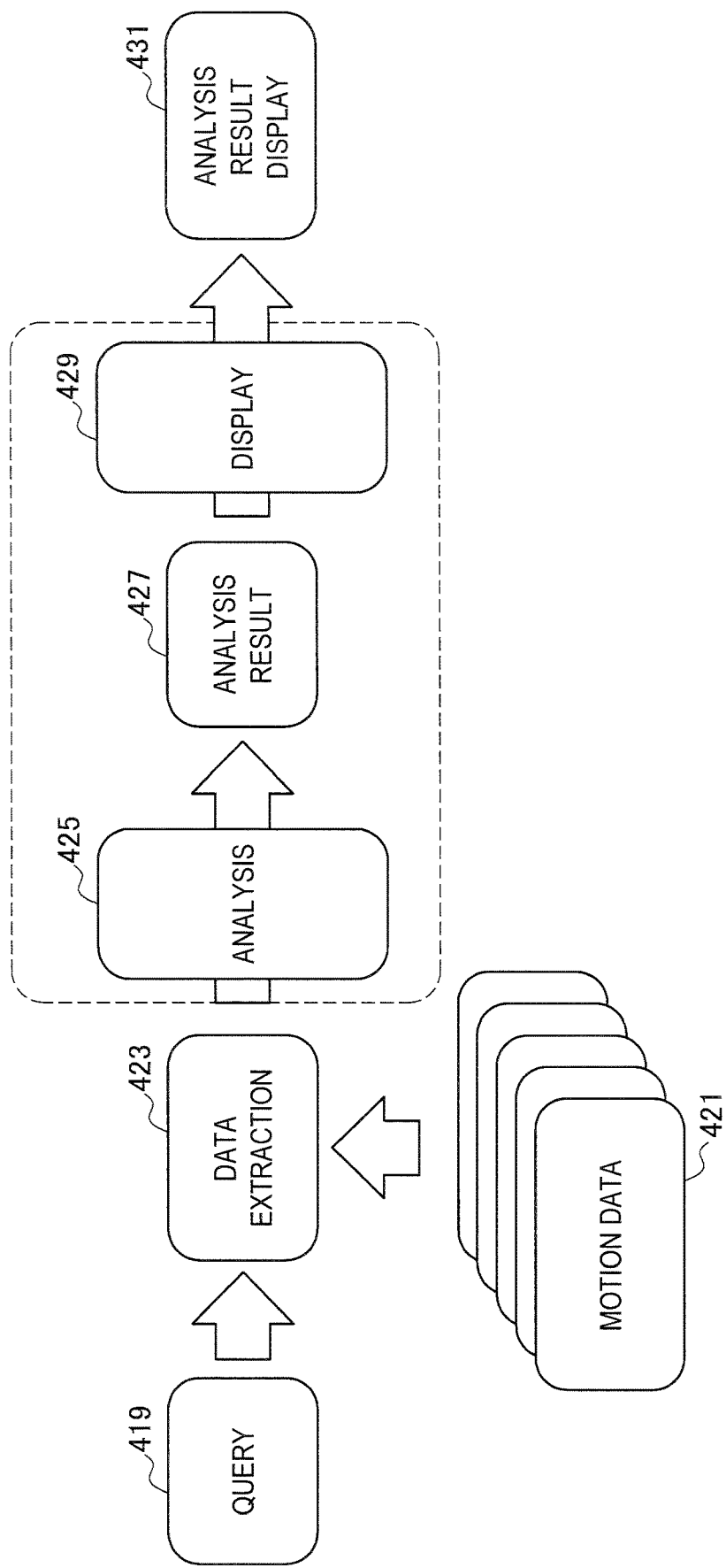
FIG. 11 is a diagram for specifically describing an example of the analysis of the play events of a plurality of users according to an embodiment of the present disclosure.

FIG. 11 is a diagram for specifically describing an example of the analysis of the play events of a plurality of users according to an embodiment of the present disclosure. Referring to FIG. 11, the processor that performs the analysis process issues a query 419, and performs an extraction process 423 of extracting data from motion data 421. An analysis result 427 is obtained from the extracted data through an analysis process 425. Further, a display 431 of the analysis result is implemented based on the analysis result 427 through a display process 429.

In the query 419, for example, the type of play event to be extracted (for example, a type of shot such as a forehand stroke, a backhand stroke, a serve, or the like in the case of tennis) and the user of an extraction target are designated.

For example, the motion data 421 of many users is stored in a database of the storage section 330 of the server 300, but the number of users for whom the analysis of the play events in the present embodiment, for example, the determination of the degree of similarity of the play, can be effectively performed is limited, and thus the user of the target may be limited. Further, since the motion data is also a sort of personal information, the users of the extraction target may be limited by limiting a publication target (up to friends or the like).

In the analysis process 425, the processes of the feature extraction section 407 and the determination section 409 are performed. In other words, the features of the play events are extracted from the extracted motion data (which is limited to a specific type of play event by the query 419), and the determination of the degree of similarity or the like is performed based on the extracted features. For example, when the distances of the plays of a plurality of players (users) in the feature space are calculated in the analysis process 425, the process is performed by the following program:

```
For i=1,...,N
    for j=i+1,...,N
        (calculate average distance between feature of player i and feature of player j)
        (substitute calculated distance into C(i,j))
    end
end
```

In the above case, the analysis result 427 indicating the distance between the plays of the respective players in the feature space may include a matrix C. As described in the above program, in the matrix C, an element C(i,j) indicates a distance between a play of an i-th player and a play of a j-th player in the feature space. Further, in this case, in the display process 429, the distance between the plays of the respective players in the feature space expressed by the matrix C is expressed on the 2D plane through a process of solving an optimization problem illustrated in the following Formula 1.

[Math. 1]

$$\max_x \sum_{i<j} (\|x_i - x_j\| - C(i, j))^2 \qquad \text{(Formula 1)}$$

Figure 12:
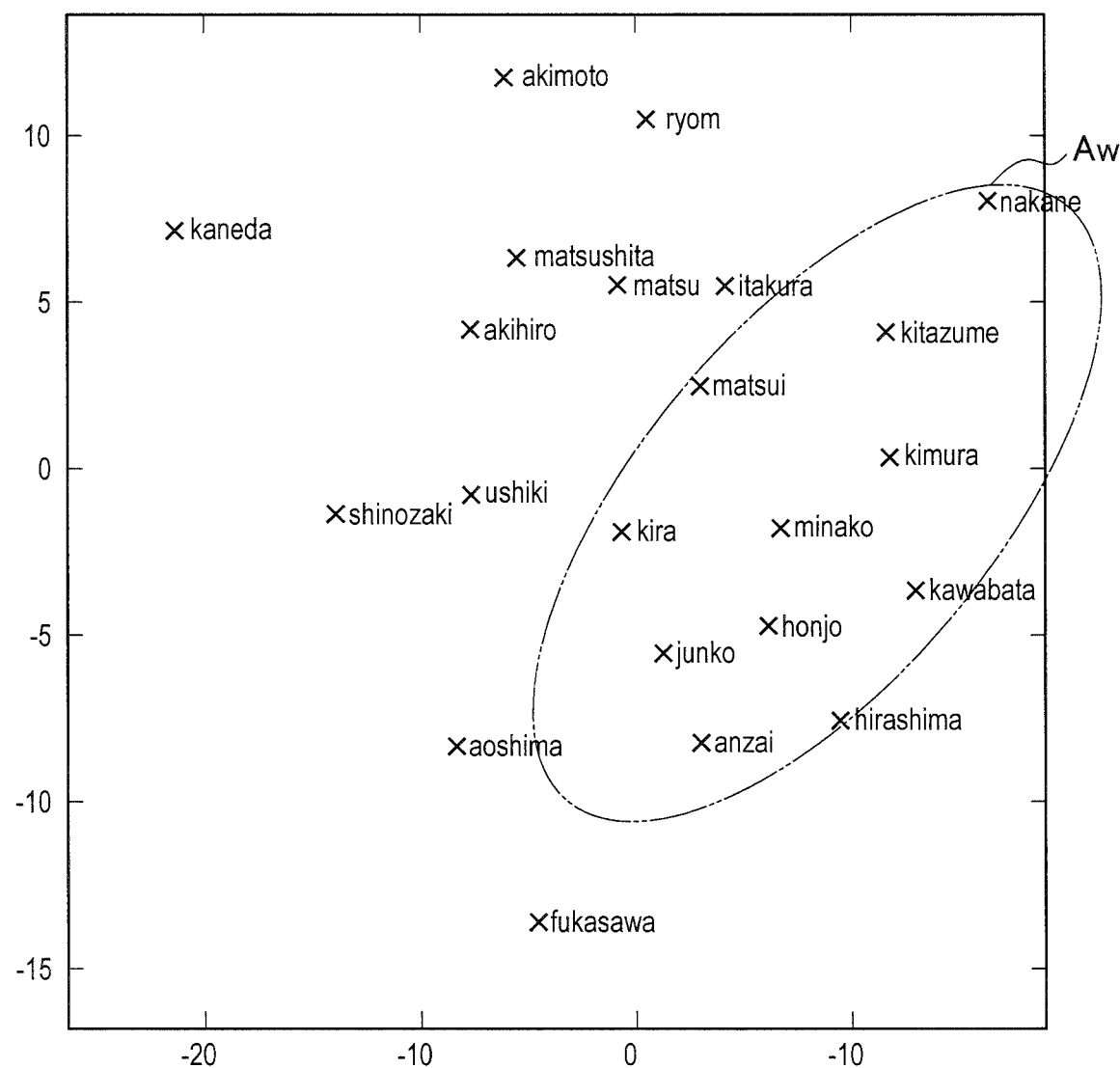
FIG. 12 is a diagram illustrating an example of information in which an analysis result illustrated in FIG. 11 is expressed on a 2D plane.
Figure 13:
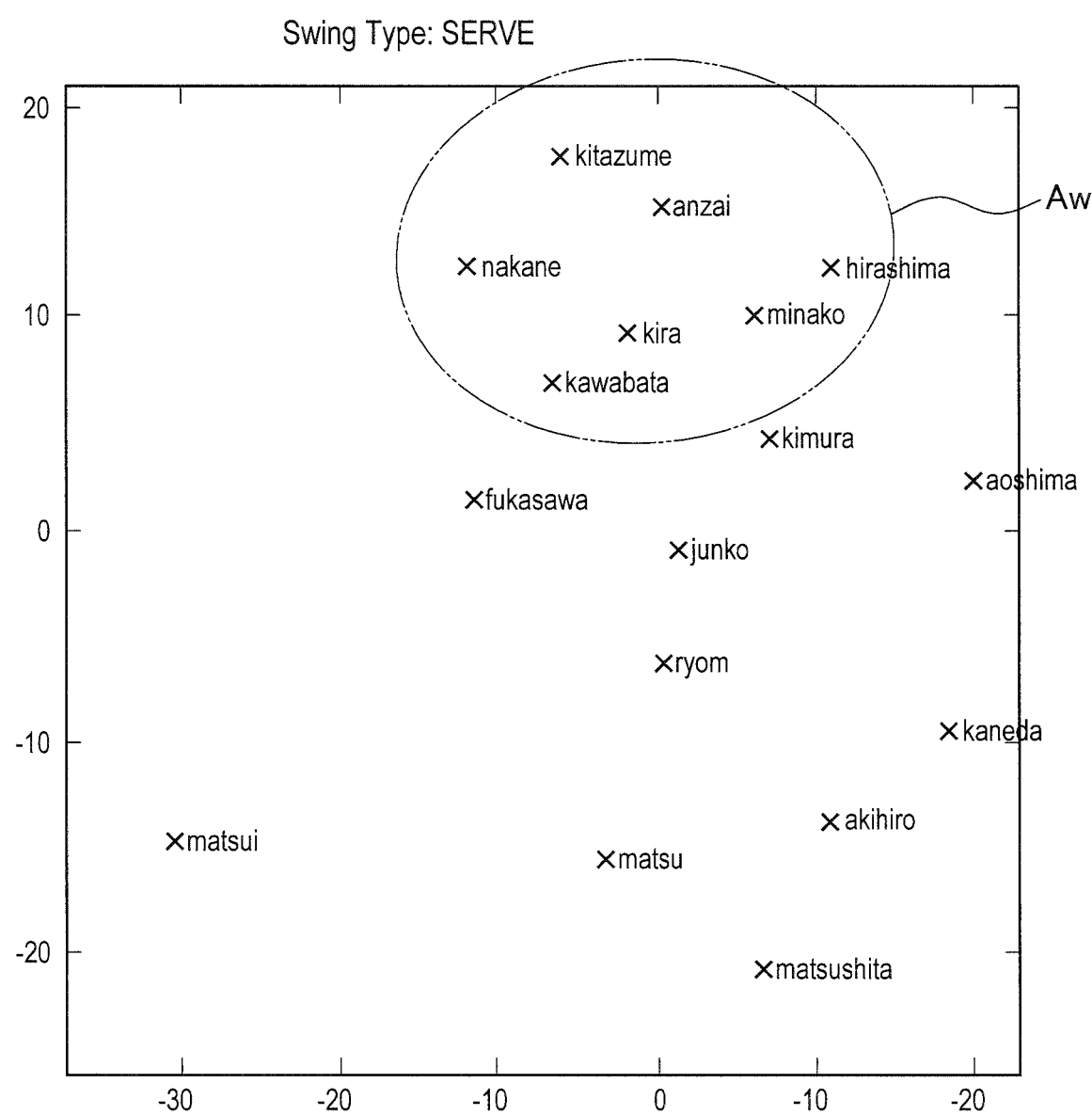
FIG. 13 is a diagram illustrating an example of information in which an analysis result illustrated in FIG. 11 is expressed on a 2D plane.

FIGS. 12 and 13 are diagrams illustrating examples of information for expressing the analysis result illustrated in FIG. 11 on the 2D plane. In the illustrated example, when a plurality of users actually play tennis, triaxial acceleration and data (motion data) of an angular velocity were acquired using the sensor apparatus 100 mounted on the racket, and a positional relation between the features extracted from the motion data of the user in the feature space was expressed on the 2D plane. FIG. 12 illustrates the features of the play events in which the type (the swing type) is the forehand stroke, and FIG. 13 illustrates the features of the play events in which the type is the serve. For example, expressions of regions on the 2D plane illustrated in FIGS. 12 and 13 may also be used, for example, when the processor that performs the analysis process implements the function of causing the information generated in the analysis to be displayed on the display.

In the above example, in FIGS. 12 and 13, the features of female players (users) show a tendency to be distributed in a concentrated region Aw on the 2D plane. Things specifically indicated by this tendency can be variously inferred. By analyzing the features for each type of play event based on this result, a certain tendency is estimated to be easily shown in the analysis result.

Figure 14:
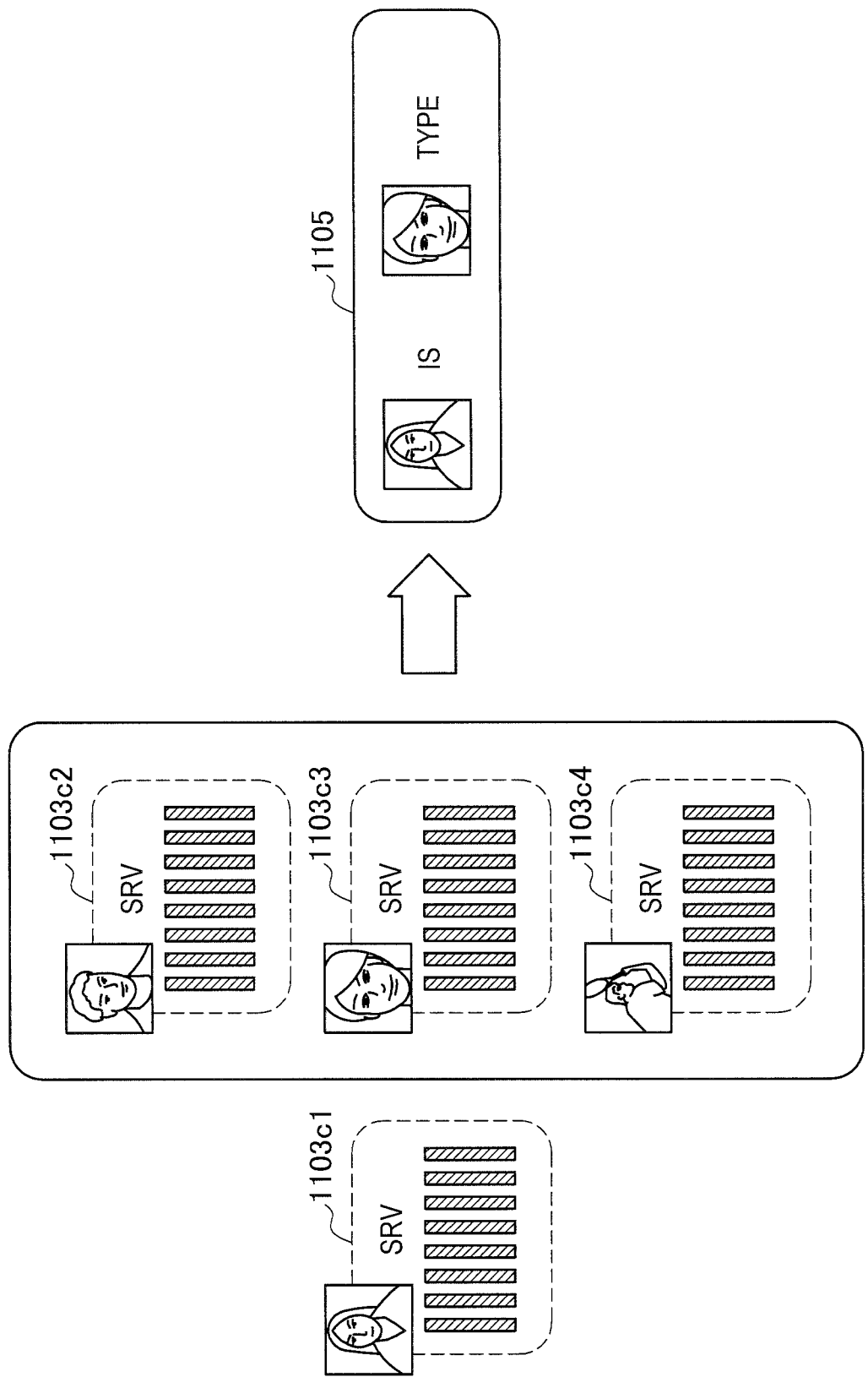
FIG. 14 is a diagram illustrating an additional example of an analysis result of play events of a plurality of users according to the present embodiment.

FIGS. 14 and 15 are diagrams illustrating additional examples of the analysis result of the play events of a plurality of users according to the present embodiment. An expression of the analysis result of such an example may also be used for the display of the information generated in the analysis.

In the example illustrated in FIG. 14, among other users (who may be, for example, professional players) serving as comparison targets, a user whose play is similar to a play (serve) indicated by a play event group 1103c1 for a serve of a certain user is determined. In this case, the features of the play events included in the play event group 1103c1 of the user are compared with the features of the play events included in each of play event groups 1103c2 to 1103c4 of the other users, and the degree of similarity is calculated for each of the play event groups 1103c2 to 1103c4. In the illustrated example, since the degree of similarity of the play event group 1103c3 is highest, an analysis result 1105 indicating that the user is the same type as the user of the play event group 1103c3 is output.

In the example illustrated in FIG. 15, for the play (serve) indicated by the play event group 1103c for the serve, the features of the play events of the respective users are mapped on the 2D plane, and an analysis result 1107 displayed together with icons indicating the respective users is output. The analysis result 1107 is similar to, for example, the map described above with reference to FIGS. 12 and 13, but, for example, since the analysis result 1107 is displayed together with the icons, it is easily understood that it is a degree-of-similarity map for the plays of the respective users.

(3. Hardware Configurations)

Next, examples of hardware configurations for implementing the sensor apparatus and the analysis apparatus (in the above described examples, the sensor apparatus, the smart phone, or the server) according to an embodiment of the present disclosure will be described with reference to FIGS. 16 and 17.

(Sensor Apparatus)

Figure 16:
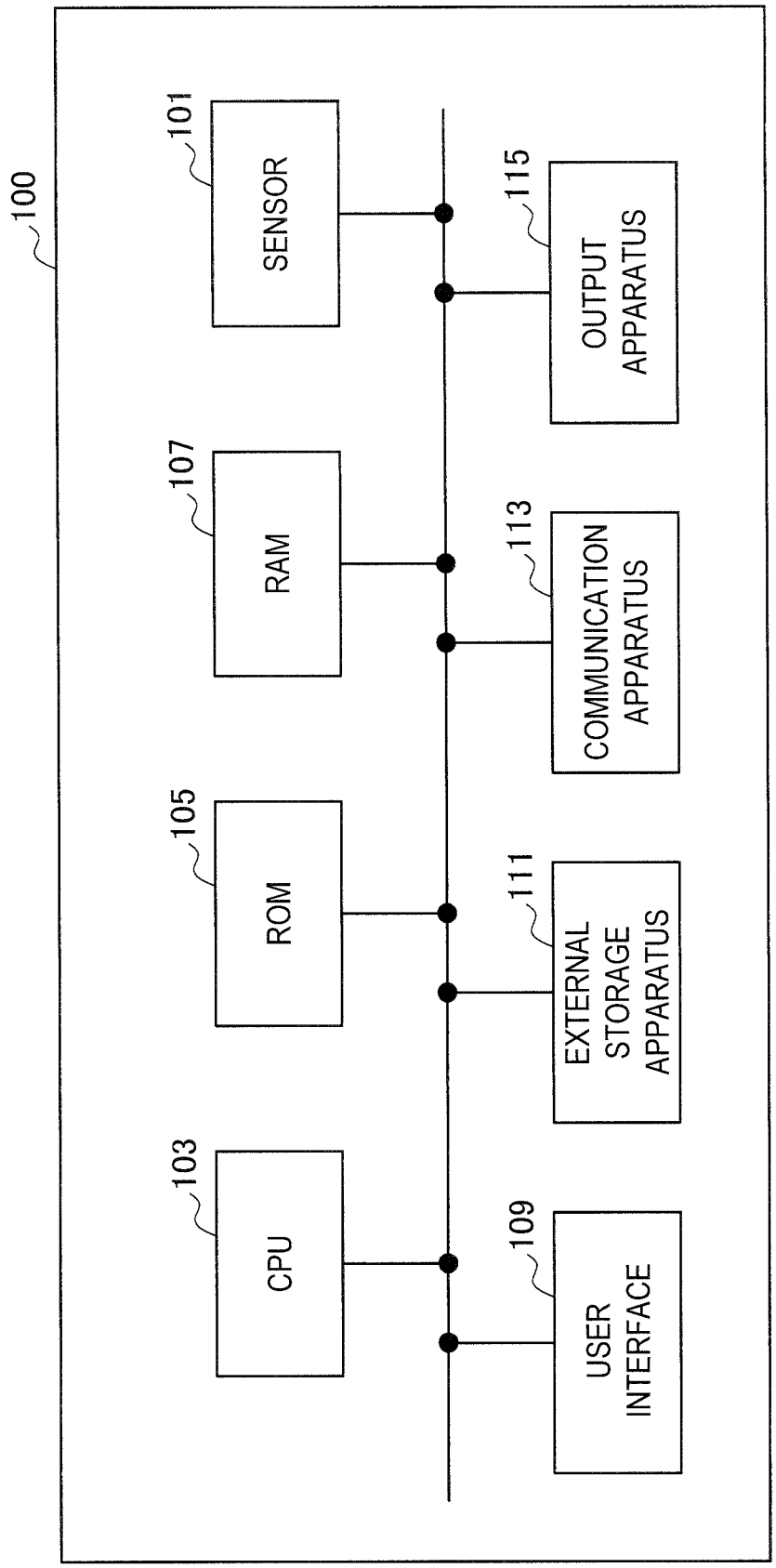
FIG. 16 is a diagram illustrating an example of a hardware configuration of a sensor apparatus according to an embodiment of the present disclosure.

FIG. 16 is a diagram illustrating an example of a hardware configuration of the sensor apparatus according to an embodiment of the present disclosure. With reference to FIG. 16, the sensor apparatus 100 may include a sensor 101, a Central Processing Unit (CPU) 103, a Read Only Memory (ROM) 105, a Random Access Memory (RAM) 107, a user interface 109, an external storage apparatus 111, a communication apparatus 113, and an output apparatus 115. These elements are mutually connected by a bus, for example.

For example, the sensor 101 includes an acceleration sensor, an angular velocity sensor, a vibration sensor, a magnetic field sensor, a temperature sensor, a pressure sensor (including a press switch), a Global Positioning System (GPS) receiver or the like. The sensor 101 may include a camera (imaging sensor) or a microphone (audio sensor).

The CPU 103, the ROM 105 and the RAM 107 implement various types of functions with software, by reading and executing program instructions, for example, recorded in the external storage apparatus 111. In the embodiments of the present disclosure, functions such as control of the entire sensor apparatus 100 may be implemented, for example, by the CPU 103, the ROM 105 and the RAM 107.

The user interface 109 is, for example, an input apparatus such as buttons or a touch panel, which receives user operations of the sensor apparatus 100. For example, operations of a user may instruct the start or completion of the transmission of sensor information from the sensor apparatus.

The external storage apparatus 111 stores various types of information related to the sensor apparatus 100. For example, program instructions for causing functions to be implemented by software in the CPU 103, the ROM 105 and RAM 107 may be stored in the external storage apparatus 111, or data acquired by the sensor 101 may be cached temporarily. When considering that the sensor apparatus 100 is mounted in a hitting tool or the like, it is desirable to use a sensor apparatus, for example, with a strong impact such as a semiconductor memory, as the external storage apparatus 111.

Further, a configuration corresponding to an internal storage region memory or an external storage device) that accumulates data detected in the sensor apparatus 100 when the smart phone 200 is not arranged near the user who is playing a sport is the ROM 105, the RAM 107, and/or the external storage apparatus 111.

The communication apparatus 113 communicates with the analysis apparatus 600, which will be described later, by various types of wired or wireless communication systems. Further, the communication apparatus 113 may directly communicate with the analysis apparatus 600 by inter-device communication, or may communicate with the analysis apparatus 600 via a network such as the internet.

The output apparatus 115 is constituted by an apparatus capable of outputting information as light, audio or images. For example, the output apparatus 115 may output information which notifies detection of a time or play event in the sensor apparatus 100, or may output a visual or aural notification to a user, based on an analysis result received from the analysis apparatus 600 or an analysis result calculated in the sensor apparatus 100. For example, the output apparatus 115 includes, for example, a display such as a lamp of an LED or the like or an LCD, a speaker, a vibrator or the like.

(Analysis Apparatus)

Figure 17:
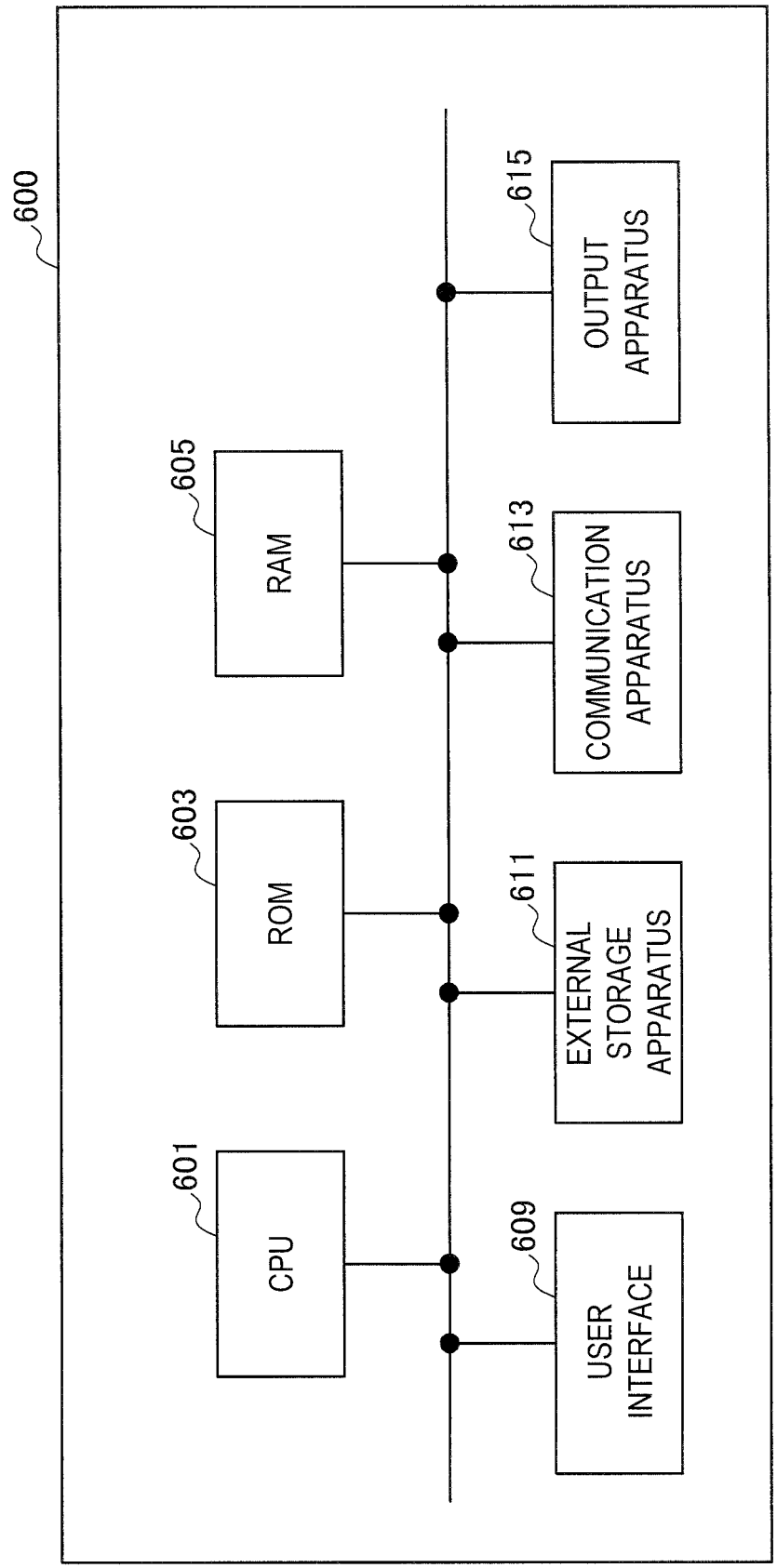
FIG. 17 is a diagram illustrating an example of a hardware configuration of an analysis apparatus according to an embodiment of the present disclosure.

FIG. 17 is a diagram illustrating an example of a hardware configuration of the analysis apparatus according to an embodiment of the present disclosure. The analysis apparatus 600 may implement, for example, the analysis apparatus according to an embodiment of the present disclosure, or the smart phone 200 or the server 300 described above. Note that, as described above, the analysis apparatus may be implemented by the sensor apparatus 100.

The analysis apparatus 600 may include a CPU 601, a ROM 603, a RAM 605, a user interface 609, an external storage apparatus 611, a communication apparatus 613, and an output apparatus 615. These elements are mutually connected by a bus, for example.

The CPU 601, the ROM 603 and the RAM 605 implement various types of functions with software, by reading and executing program instructions, for example, recorded in the external storage apparatus 611. In the embodiments of the present disclosure, control of the entire analysis apparatus 600, functions of the processing section in the above described functional configuration or the like, may be implemented, for example, by the CPU 601, the ROM 603 and the RAM 605.

The user interface 609 is, for example, an input apparatus such as buttons or a touch panel, which receives user operations of the analysis apparatus 600.

The external storage apparatus 611 stores various types of information related to the analysis apparatus 600. For example, program instructions for causing functions to be implemented by software in the CPU 601, the ROM 603 and RAM 605 may be stored in the external storage apparatus 611, or sensor information received by the communication apparatus 613 may be cached temporarily. Further, a log of analysis results may be accumulated in the external storage apparatus 611.

The output apparatus 615 is constituted by an apparatus capable of visually or aurally notifying information to a user. For example, the output apparatus 615 may be a display device such as a Liquid Crystal Display (LCD), or an audio output device such as a speaker or headphones. The output apparatus 615 outputs a result obtained by the processes of the analysis apparatus 600 as video images such as text or pictures, or outputs the results as audio such as voices or sounds.

Heretofore, examples of the hardware configurations of the sensor apparatus 100 and the analysis apparatus 600 have been shown. Each of the above described constituent elements may be constituted by using generic members, or may be constituted by hardware specialized for the functions of each of the constituent elements. Such a configuration may be appropriately changed in accordance with the technology level at the time of implementation.

(4. Supplement)

For example, the embodiments of the present disclosure may include an analysis apparatus such as that described above (an information processing terminal such as a smart phone, a server, or a sensor apparatus), a system, an information processing method executed by the analysis apparatus or the system, a program for causing the analysis apparatus to function, and a non-temporarily tangible medium on which programs are recorded.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below (1)

An analysis device, including:

a process configured to implement an acquisition function of acquiring data indicating play events defined based on a motion of a user who plays a sport, an extraction function of extracting a plurality of play events classified into the same type among the play events, and an analysis function of analyzing data indicating the plurality of extracted play events.

(2)

The analysis device according to (1), wherein the analysis function analyzes a feature of the motion corresponding to the plurality of extracted play events.

(3)

The analysis device according to (2), wherein the plurality of extracted play events are the play events of a single user, and wherein the analysis function evaluates a play of the single user indicated by the plurality of extracted play events based on the feature.

(4)

The analysis device according to (3), wherein the analysis function evaluates a degree of stability of the play of the single user based on the feature.

(5)

The analysis device according to (4), wherein the analysis function determines a learning level of the play of the single user based on the degree of stability.

(6)

The analysis device according to any one of (3) to (5), wherein the analysis function detects a temporal change in the feature.

(7)

The analysis device according to (2), wherein the plurality of extracted play events include the play events of a plurality of users, and wherein the analysis function compares plays of the plurality of users indicated by the plurality of extracted play events based on the feature.

(8)

The analysis device according to (7), wherein the plurality of users include a first user and a second user, and wherein the analysis function provides information that is provided to the first user in connection with the play also to the second user whose play is indicated to be similar to the play of the first user according to a result of the comparing.

(9)

The analysis device according to any one of (1) to (8), wherein the processor further implements a display control function of causing information generated in the analysis to be displayed on a display.

(10)

The analysis device according to (9), wherein the analysis function analyzes a feature of the motion corresponding to the plurality of extracted play events, and wherein the display control function causes information indicating the feature to be displayed.

(11)

The analysis device according to (10), wherein the plurality of extracted play events include the play events of a plurality of users, and wherein the display control function causes information indicating the features of the plurality of users on a two-dimensional (2D) plane to be displayed.

(12)

A recording medium having a program stored therein, the program causing a computer to implement:

an acquisition function of acquiring data indicating play events defined based on a motion of a user who plays a sport;

an extraction function of extracting a plurality of play events classified into the same type among the play events; and an analysis function of analyzing data indicating the plurality of extracted play events.

(13) An analysis method, including:
acquiring data indicating play events defined based on a motion of a user who plays a sport;
extracting a plurality of play events classified into the same type among the play events; and
analyzing data indicating the plurality of extracted play events.

REFERENCE SIGNS LIST 10 system
100 sensor apparatus
110 sensor
120 processing section
200 smart phone
210 reception section
220 processing section
300 server
310 reception section
320 processing section.
401 metadata
403 motion data
405 filter section
407 feature extraction section
409 determination section

The invention claimed is:

1. An analysis device, comprising:
a processor configured to
acquire data from at least one sensor, the data indicating a plurality of play events that occur consecutively in a time series, and each play event being defined based on the data acquired from the at least one sensor corresponding to motions of a plurality of users who play a sport,
analyze a feature of each motion of the plurality of users corresponding to each play event of the plurality of play events based on the data acquired from the at least one sensor,
classify each play event into a type of play event among a plurality of types based on the analyzed feature of each motion,
extract play events among the plurality of play events that are classified into a selected type among the plurality of types,
analyze data indicating the extracted play events that are classified into the selected type as an integrated group for each user of the plurality of users,
determine a respective learning level of each respective user of the plurality of users with respect to the selected type of play event based on the analyzed data of the integrated group for the respective user,
determine a degree of similarity between respective learning levels of the plurality of users, and
initiate display of the determined degree of similarity between the respective learning levels by a display device,
wherein the learning level of each user is determined based on an evaluated temporal change in an evaluated degree of stability of the analyzed feature of the motion for each classified type of play event.

2. The analysis device according to claim 1,
wherein the sensor includes at least one of an acceleration sensor, a gyro sensor, a geomagnetic sensor, a vibration sensor, an environmental sensor, or an image sensor.

3. The analysis device according to claim 1,
wherein the learning level of each user is determined for each type of play event.

4. The analysis device according to claim 1,
wherein supplementary information is provided to each user according to the determined learning level of the user.

5. The analysis device according to claim 1,
wherein the processor is further configured to initiate the display of the determined degree of similarity between respective learning levels while limiting personal information of users according to relationships among the plurality of users.

6. The analysis device according to claim 1,
wherein the processor is further configured to determine a degree of similarity between respective learning levels of at least one user of the plurality of users and a comparison target that is not one of the plurality of users.

7. A non-transitory computer-readable recording medium having embodied thereon a program, which when executed by a computer causes the computer to execute a method, the method comprising:
acquiring data from at least one sensor, the data indicating a plurality of play events that occur consecutively in a time series, and each play event being defined based on the data acquired from the at least one sensor corresponding to motions of a plurality of users who play a sport;
analyzing a feature of each motion of the plurality of users corresponding to each play event of the plurality of play events based on the data acquired from the at least one sensor;
classifying each play event into a type of play event among a plurality of types based on the analyzed feature of each motion;
extracting play events among the plurality of play events that are classified into a selected type among the plurality of types;
analyzing data indicating the extracted play events that are classified into the selected type as an integrated group;
determining a respective learning level of each respective user of the plurality of users with respect to the selected type of play event based on the analyzed data of the integrated group for the respective user;
determining a degree of similarity between respective learning levels of the plurality of users; and
displaying the determined degree of similarity between the respective learning levels by a display device,
wherein the learning level of each user is determined based on an evaluated temporal change in an evaluated degree of stability of the analyzed feature of the motion for each classified type of play event.

8. An analysis method, implemented via at least one processor, the method comprising:
acquiring data from at least one sensor, the data indicating a plurality of play events that occur consecutively in a time series, and each play event being defined based on the data acquired from the at least one sensor corresponding to motions of a plurality of users who play a sport;
analyzing a feature of each motion of the plurality of users corresponding to each play event of the plurality of play events based on the data acquired from the at least one sensor;

classifying each play event into a type of play event among a plurality of types based on the analyzed feature of each motion;
extracting play events among the plurality of play events that are classified into a selected type among the plurality of types;
analyzing data indicating the extracted play events that are classified into the selected type as an integrated group;
determining a respective learning level of each respective user of the plurality of users with respect to the selected type of play event based on the analyzed data of the integrated group for the respective user;
determining a degree of similarity between respective learning levels of the plurality of users; and
displaying the determined degree of similarity between the respective learning levels by a display device,
wherein the learning level of each user is determined based on an evaluated temporal change in an evaluated degree of stability of the analyzed feature of the motion for each classified type of play event.

* * * * *